US012146525B2

(12) United States Patent
Bondioli

(10) Patent No.: US 12,146,525 B2
(45) Date of Patent: Nov. 19, 2024

(54) DRIVE SHAFT WITH LUBRICATED ACCIDENT-PREVENTION END PROTECTIONS

(71) Applicants: Lea Lusetti, Suzzara (IT); Carlo Bondioli, Suzzara (IT); Claudio Bondioli, Borgo a Virgilio (IT)

(72) Inventor: Edi Bondioli

(*) Notice: Subject to any disclaimer, the term of this patent is extended or adjusted under 35 U.S.C. 154(b) by 262 days.

(21) Appl. No.: 17/429,881

(22) PCT Filed: Nov. 3, 2020

(86) PCT No.: PCT/EP2020/080766
§ 371 (c)(1),
(2) Date: Aug. 10, 2021

(87) PCT Pub. No.: WO2021/089515
PCT Pub. Date: May 14, 2021

(65) Prior Publication Data
US 2022/0268319 A1    Aug. 25, 2022

(30) Foreign Application Priority Data
Nov. 7, 2019 (IT) .................. 102019000020574

(51) Int. Cl.
| F16C 3/03 | (2006.01) |
| F16C 3/035 | (2006.01) |
| F16D 3/40 | (2006.01) |
| F16D 3/41 | (2006.01) |
| F16D 3/84 | (2006.01) |
| A01B 71/06 | (2006.01) |

(52) U.S. Cl.
CPC .............. F16C 3/03 (2013.01); F16C 3/035 (2013.01); F16D 3/40 (2013.01); F16D 3/41 (2013.01); F16D 3/841 (2013.01); F16D 3/848 (2013.01); A01B 71/06 (2013.01); F16C 2310/00 (2013.01); F16C 2326/06 (2013.01); F16D 2300/06 (2013.01)

(58) Field of Classification Search
CPC ....... A01B 71/06; A01B 71/063; F16B 7/182; F16C 3/03; F16C 3/035; F16D 3/38; F16D 3/382; F16D 3/387; F16D 3/40; F16D 3/841; F16D 2300/06; Y10S 464/905
USPC ................... 464/7, 11, 15, 16, 136, 905
See application file for complete search history.

(56) References Cited

U.S. PATENT DOCUMENTS 4,236,388 A * 12/1980 Geisthoff ............... F16D 3/841
                                                    464/169
5,169,358 A * 12/1992 Bondioli ................ F16D 3/841
                                                    464/172
(Continued)

FOREIGN PATENT DOCUMENTS

DE    1118525 B  * 11/1961 ............. F16D 3/841
DE    2402726 A1 *  9/1974 ............. F16D 3/841
(Continued)

*Primary Examiner* — Josh Skroupa
(74) *Attorney, Agent, or Firm* — McGlew and Tuttle, P.C.

(57) ABSTRACT

The drive shaft (1) comprises end universal joints (5, 7) with accident-preventing end protections (19). Each accident-preventing end protection comprises a lubricant reservoir, delimited radially inwardly by a sleeve (63) of an inner fork (23) of the respective universal joint (5; 7) and radially outwardly by a rigid annular structure of the accident-preventing end protection.

20 Claims, 17 Drawing Sheets

(56) References Cited

U.S. PATENT DOCUMENTS

| | | | |
|---|---|---|---|
| 5,173,082 A | 12/1992 | Bondioli | |
| 5,718,266 A | 2/1998 | Bondioli | |
| 5,772,521 A * | 6/1998 | Herchenbach | F16D 3/841 464/170 |
| 5,800,271 A * | 9/1998 | Herchenbach | F16D 3/841 464/175 |
| 6,102,804 A * | 8/2000 | Kretschmer | F16D 3/06 464/7 |
| 6,186,901 B1 * | 2/2001 | Bondioli | F16C 3/035 464/162 |
| 6,334,733 B1 * | 1/2002 | Tyson | F16B 7/182 403/388 |
| 6,511,379 B2 | 1/2003 | Bondioli | |
| 9,410,582 B2 * | 8/2016 | Brunazzi | F16D 3/848 |
| 10,323,692 B2 * | 6/2019 | Lentini | F16D 3/387 |
| 2002/0010027 A1 * | 1/2002 | Bondioli | F16D 3/841 464/11 |

FOREIGN PATENT DOCUMENTS

| | | | |
|---|---|---|---|
| DE | 19510077 C1 * | 4/1996 | A01B 71/08 |
| DE | 202018103844 U1 * | 8/2018 | F16C 3/035 |
| EP | 1288515 A1 | 3/2003 | |
| EP | 2520813 A2 | 11/2012 | |
| EP | 2868941 A1 | 5/2015 | |
| FR | 1292839 A * | 5/1962 | F16D 3/841 |
| FR | 2393226 A1 * | 12/1978 | F16D 3/841 |
| FR | 2550833 A2 | 2/1985 | |
| JP | 02074416 A * | 3/1990 | F16D 3/40 |
| JP | 2675099 B2 * | 11/1997 | F16D 3/841 |
| WO | 9858183 A1 | 12/1998 | |

\* cited by examiner

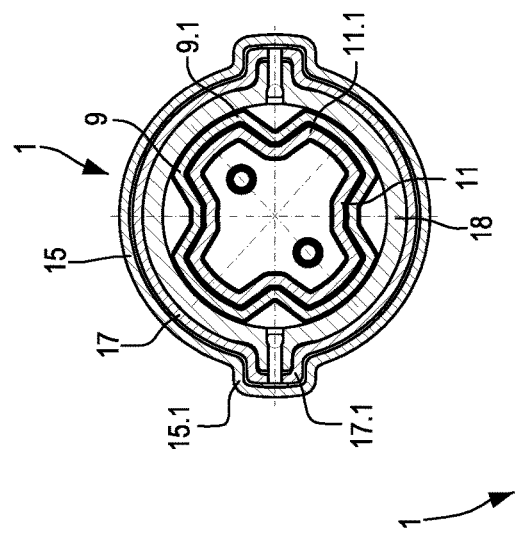
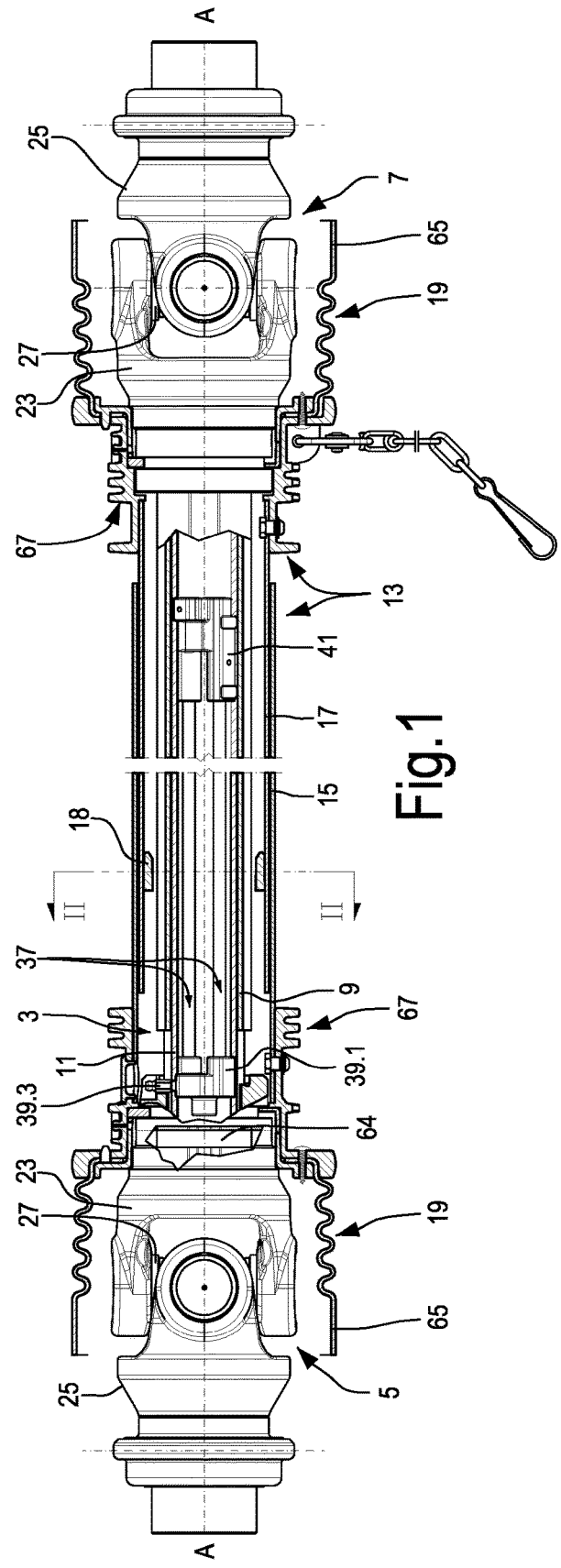

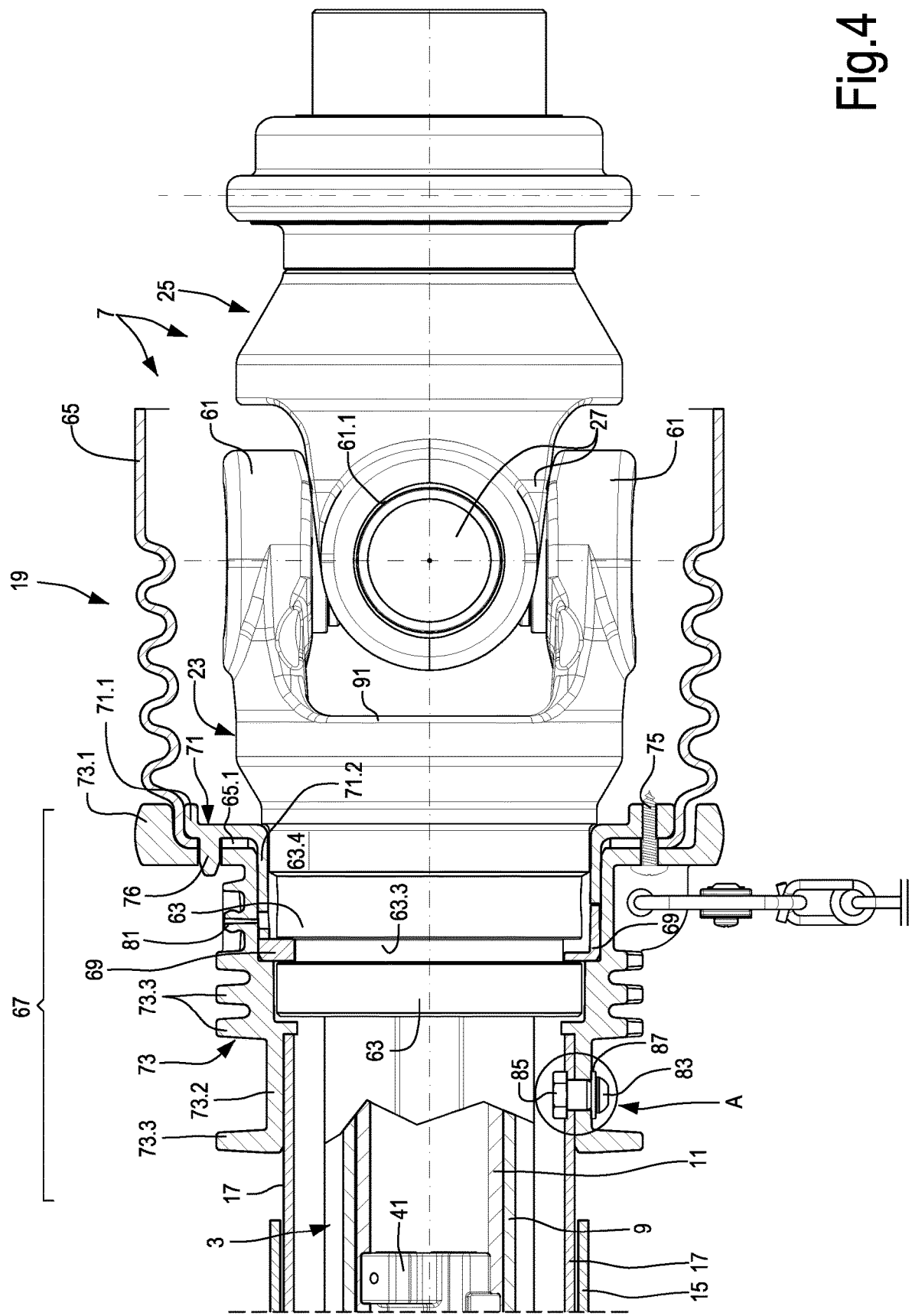

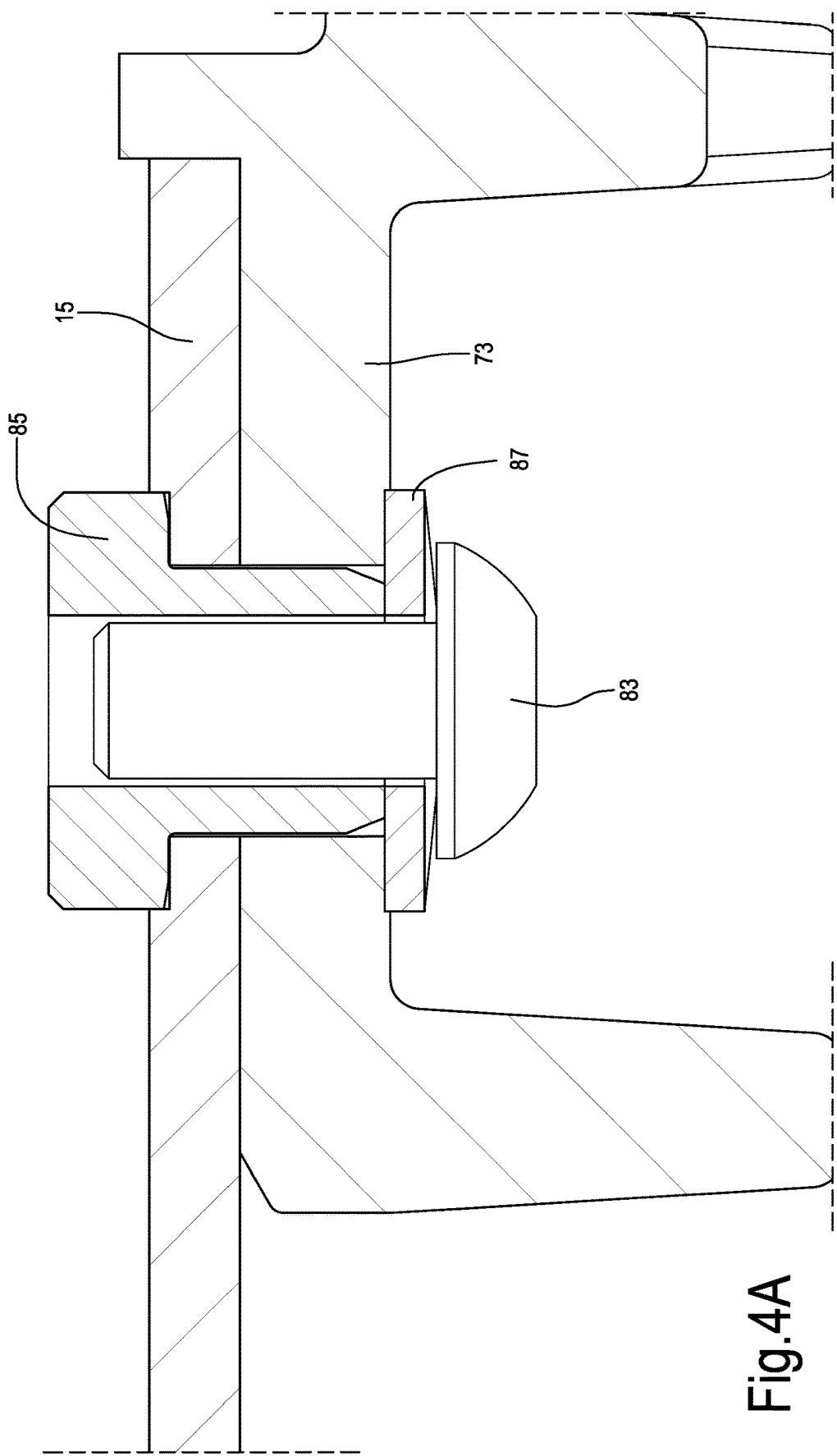

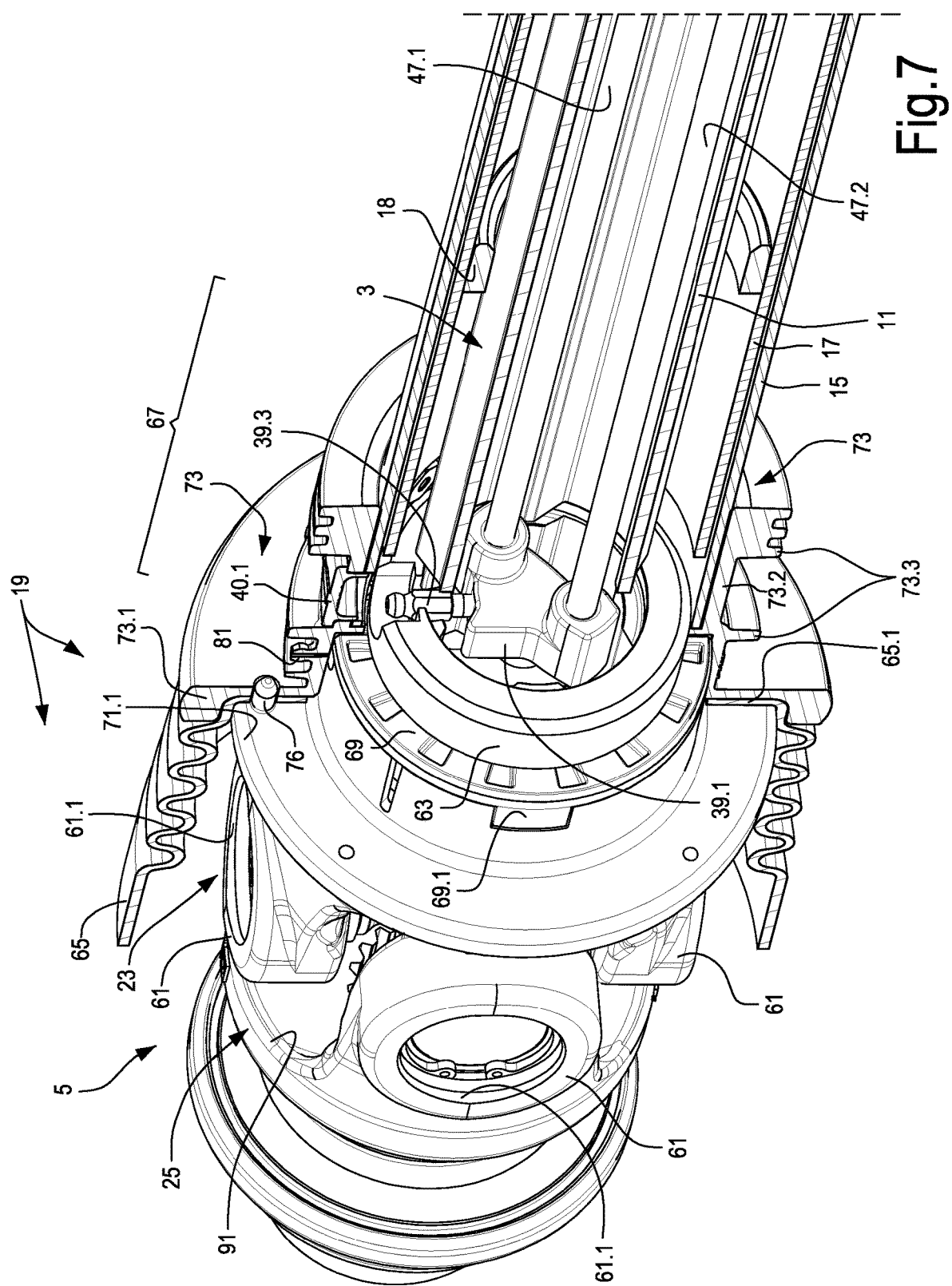

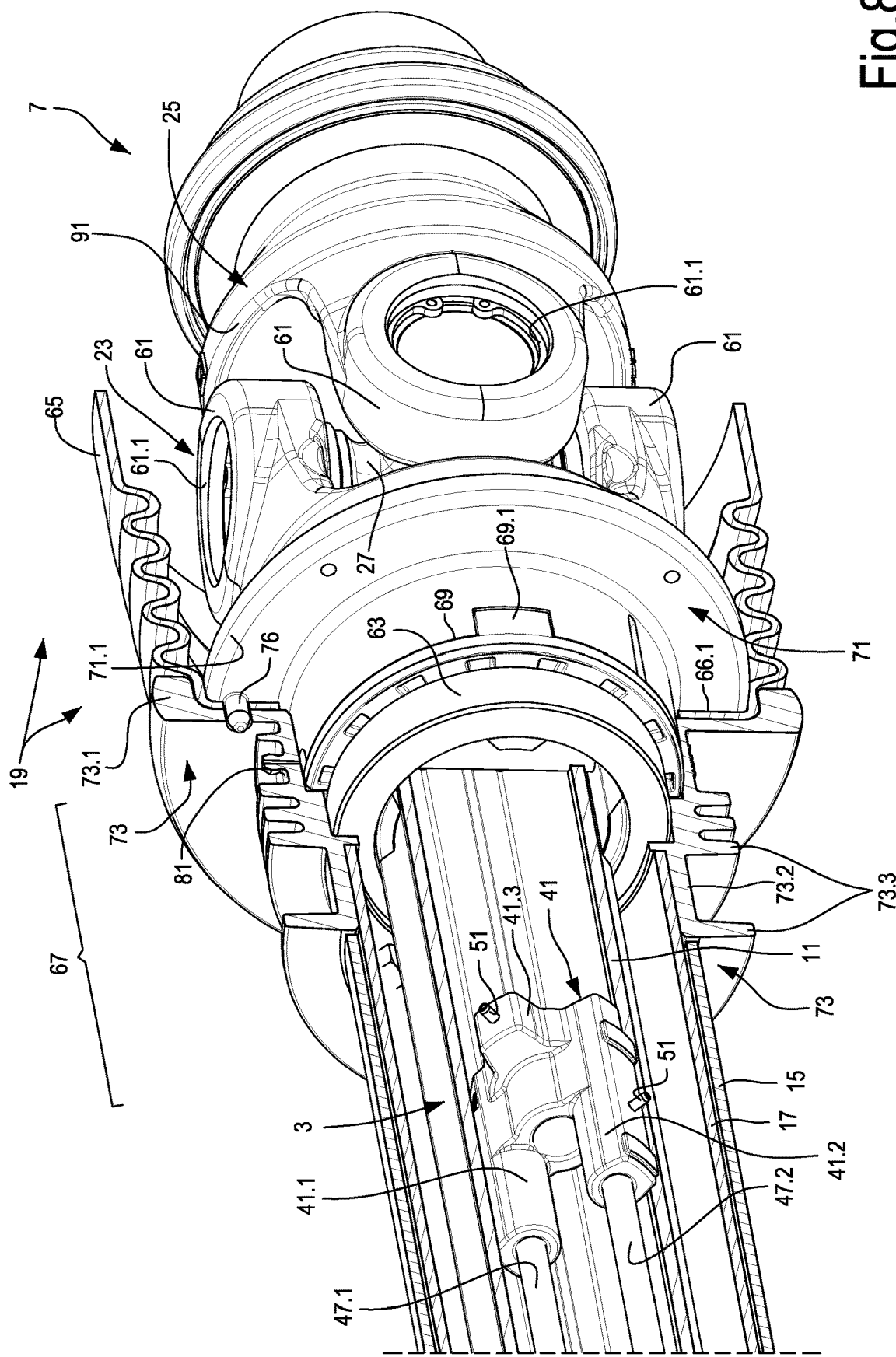

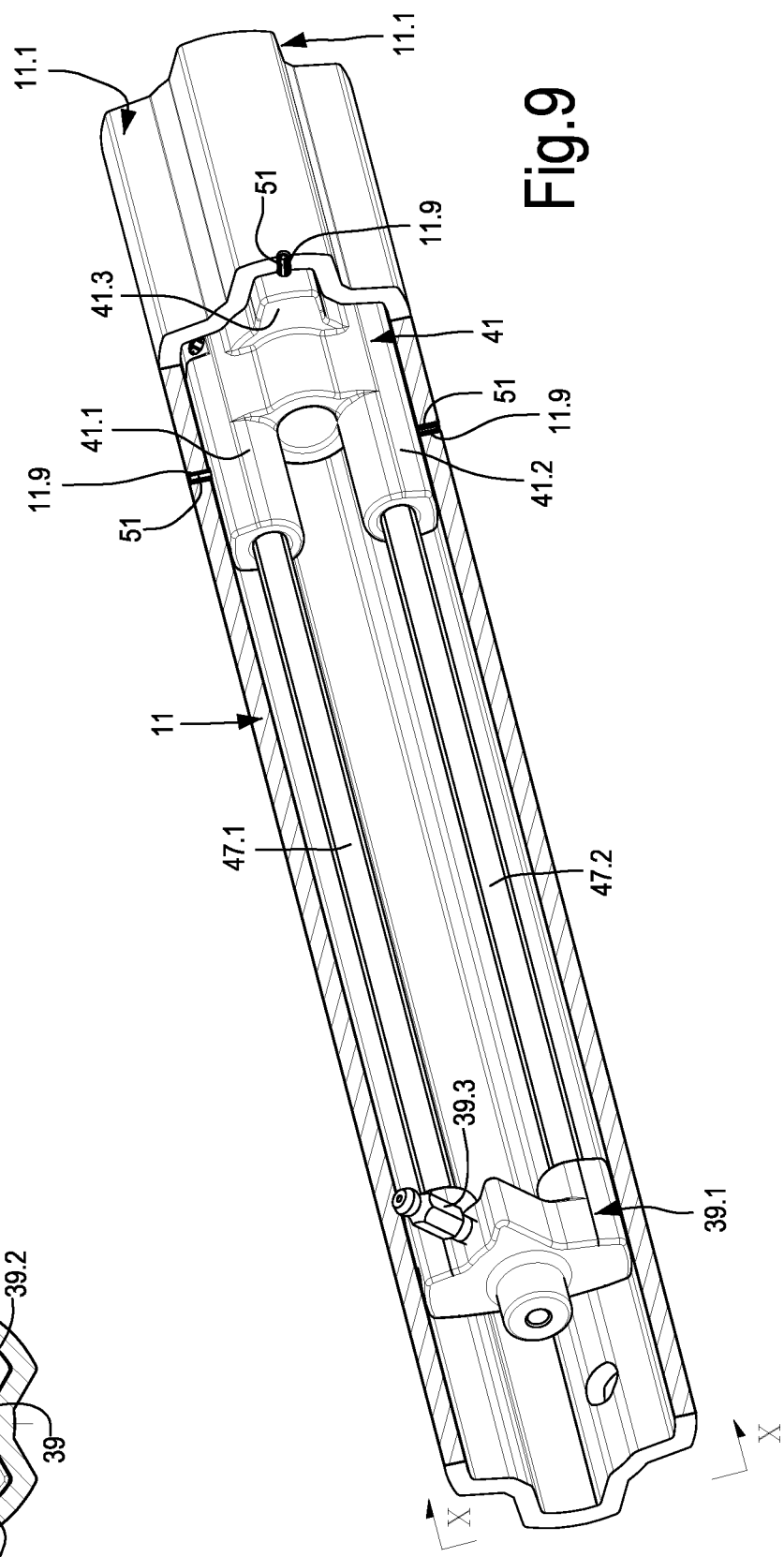
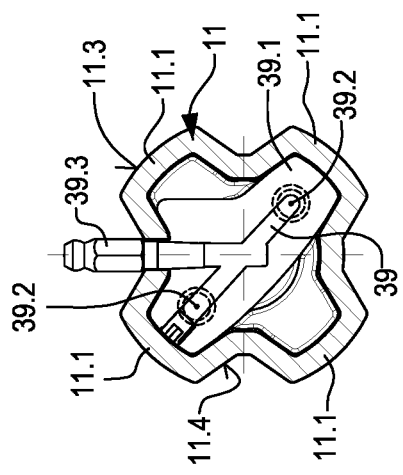

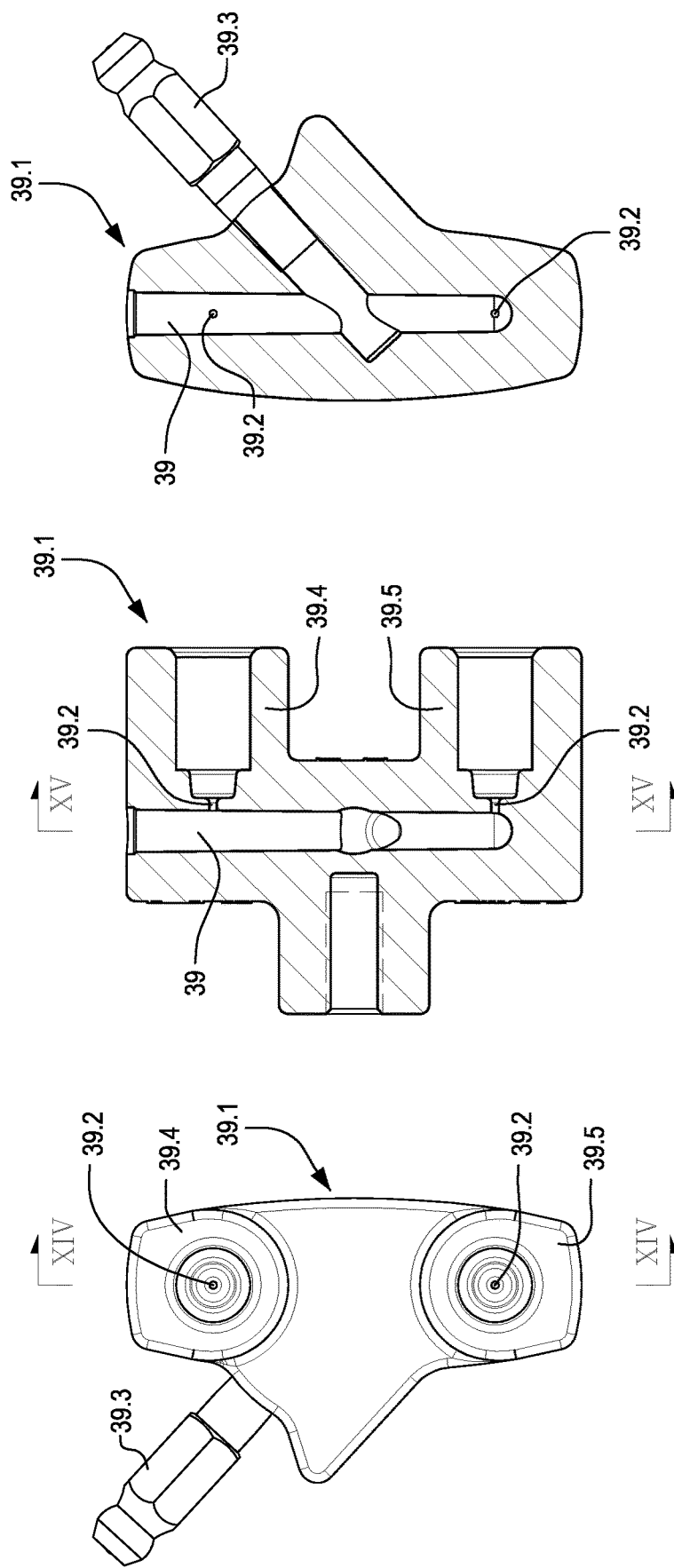

DRIVE SHAFT WITH LUBRICATED ACCIDENT-PREVENTION END PROTECTIONS

TECHNICAL FIELD

The present invention relates to the fields of power transmitting drive shafts. In particular, embodiments described herein refer to drive shafts to be used in agricultural machinery.

BACKGROUND TO THE INVENTION

Telescopic drive shafts are commonly used for transmitting power from a power source to an operating machine that can move relative to the power source. In many applications, the power take-off of the power source and the input shaft of the operating machine reciprocally move in such a way that the transmission shaft has to take different angular positions.

This need is particularly significant in agriculture, where operating machines of different kinds are connected to a tractor that constitutes the power source. The tractor is used to move the operating machine, as well as to supply it with power. The power source and the operating machine are mechanically connected through a drive shaft.

A drive shaft is generally constituted by a telescopic shaft and two end universal joints. The telescopic shaft comprises an outer tubular shaft, inside which an inner shaft, usually tubular, is slidable inserted. The outer shaft and the inner shaft, also called tubes, are torsionally coupled together, for instance through a spline, to allow torque transmission from one to the other. One of the end universal joints is connected to an end of the outer shaft forming the telescopic shaft, whilst the other universal joint is connected to an opposite end of the inner shaft. One of the two universal joints is used to couple the drive shaft to the power take-off of the power source, whilst the other is used to couple the drive shaft to the power take-off of the driven machine. This drive shaft allows the power source and the driven machine to move relative to each other, keeping the reciprocal mechanical connection.

In use, due to the mutual displacements of the power source and the driven machine, the outer shaft and the inner shaft slide with respect to each other when rotating under load.

An accident-preventing protection covers the telescopic shaft and at least part of the end universal joints.

Lubrication systems have been developed for improving the operation of the telescopic shaft, which are adapted to lubricate the surfaces of the inner shaft and of the outer shaft in sliding contact with one another. WO98/58183 and U.S. Pat. Nos. 5,173,082, 6,511,379 and EP 2520813 disclose lubrication systems for lubricating the inner and outer tubular shafts forming the telescopic shaft. These lubrication systems have allowed significantly improving the telescopic shaft operation conditions. However, these lubrication systems can be further improved, especially as regards the number of required greasing interventions.

Modern telescopic shafts have splined profiles with a plurality of longitudinal projections shaped like tabs or lobes, extending longitudinally according to the axis of the telescopic shaft. An example of this kind of splined profiles is disclosed in U.S. Pat. No. 5,718,266. In these telescopic shafts, torque and power are transmitted through the contact between a flank of each longitudinal projection of the inner tubular shaft and a corresponding flank of a groove of the outer tubular shaft. In the contact area, high pressure is generated. The more elongated the telescopic shaft is, the higher the pressure is, because of the reduced axial extension of the contact surface due to the extraction of the inner shaft from the outer shaft. The pressure between the mutually co-acting surfaces of the inner and outer tubular shafts generates friction, and thus wear of the mechanical components, as well as resistance against axial sliding, adversely affecting the transmission operation.

WO98/58183 discloses a drive shaft of the type described above, provided with an accident-preventing protection. This protection comprises a telescopic tubular protection surrounding the outer shaft and the inner shaft of the drive shaft and formed by a first guard tube and a second guard tube, inserted into the first one, that can slide with respect to each other to follow the drive shaft shortening and lengthening movements. The accident-preventing protection further comprises end boots for each of the two universal joints of the drive shaft. Each end boot is fastened to the telescopic tubular protection, more precisely to one of the two guard tubes forming it, and may have a flexible hood integral with a rigid annular structure. The end boot is fastened to the inner fork of the respective universal joint through the rigid annular structure. Each rigid annular structure comprises an annular sliding block slidably engaged in an annular groove provided on the sleeve of the inner fork of the respective universal joint. Each end boot further comprises a lubrication system, adapted to lubricate with lubricating grease the surfaces, formed by the annular sliding block and the annular groove, in sliding contact with one another.

The lubricating grease reduces during operation, and is partially dispersed in the environment. To operate properly, the accident-preventing protection therefore needs frequent greasing interventions, requiring to shut the machine, in which the drive shaft is installed, down, and to add lubricant, typically using a greasing nipple, to keep the mutually touching and mutually sliding surfaces of the annular groove and the annular sliding block sufficiently greased.

In these known drive shafts, the need for frequent greasing interventions is a drawback. It would be therefore useful and advantageous to have available a drive shaft with respective accident-preventing protection, allowing reducing the greasing interventions.

Greasing problems arise also for the universal joints, and more specifically for the needle bearings interposed between the spider trunnions and the seats of the trunnions in the arms of the forks of the end universal joints. Inevitably, the lubricant grease leaks through the bearing seals, and this requires continuous refilling through greasing operations.

Moreover, especially in agricultural applications, the universal joints are subjected to significant dynamic stresses, due to the fact that the joints of the drive shaft operate with a significant angular offset. Furthermore, in these applications very high torques shall be transmitted. All this results in high dynamic stresses on the bearings of the universal joints.

It would be therefore useful and advantageous to have available drive shafts requiring fewer greasing interventions, or even no greasing of the joints. It would be also advantageous to optimize the operating conditions of the joints under load.

In general, it would be therefore advantageous to have available a drive shaft which completely or partially overcomes at least some of the drawbacks of the prior art drive shafts, above all as regards greasing requirements and useful life of the wearable components.

SUMMARY

To overcome, at least partially, the drawbacks of the prior art drive shafts, a device according to claim 1 is suggested.

Particularly advantageous embodiments are defined in the dependent claims.

BRIEF DESCRIPTION OF THE DRAWING

The invention will be better understood by following the description below and the attached drawing, showing a non-limiting embodiment of the invention. More specifically, in the drawing:

FIG. 1 shows a cross-section of a drive shaft according to a plane containing the shaft axis;

FIG. 2 shows a cross-section according to the line II-II of FIG. 1;

FIG. 4 shows an enlargement of the other end of the drive shaft of FIG. 1;

FIG. 4A shows an enlarged cross-section of the detail indicated by the letter A in FIG. 4;

FIG. 7 shows the end of the drive shaft illustrated in FIG. 5, with some parts removed;

FIG. 8 shows the end of the drive shaft illustrated in FIG. 6 with some parts removed;

FIG. 9 is a cut-away isometric view of the inner shaft with the lubricating system of the telescopic shaft;

FIG. 10 is a view according to X-X of FIG. 9;

FIG. 13 is a front view according to XIII-XIII of FIG. 12;

FIG. 14 is a cross-section according to the line XIV-XIV of FIG. 13;

FIG. 15 shows a cross-section according to XV-XV of FIG. 14;

DETAILED DESCRIPTION

Figure 3:
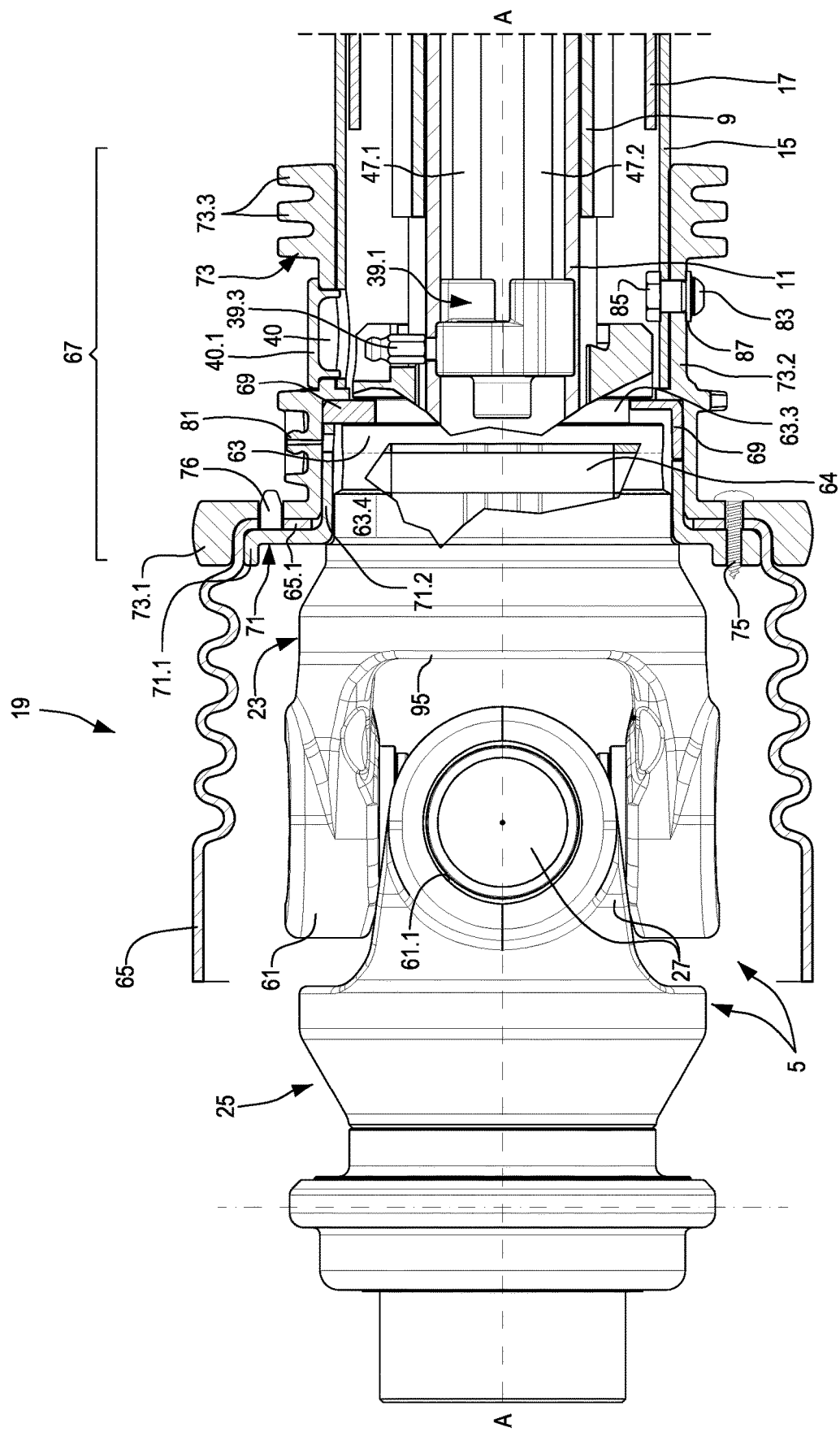
FIG. 3 shows an enlargement of a first end of the drive shaft of FIG. 1.
Figure 5:
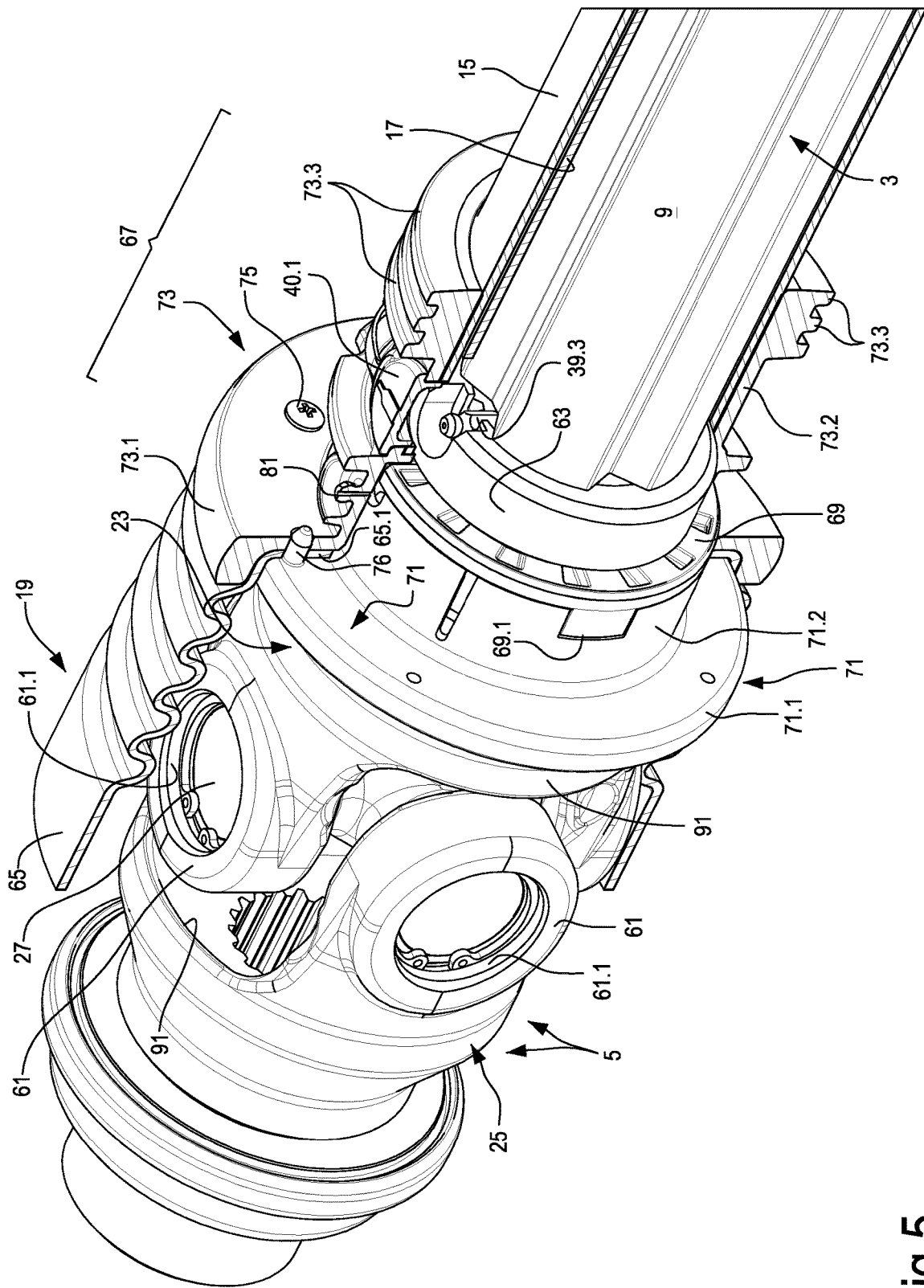
FIG. 5 is an enlarged and partially cut-away isometric view of the end of FIG. 3 of the drive shaft.
Figure 6:
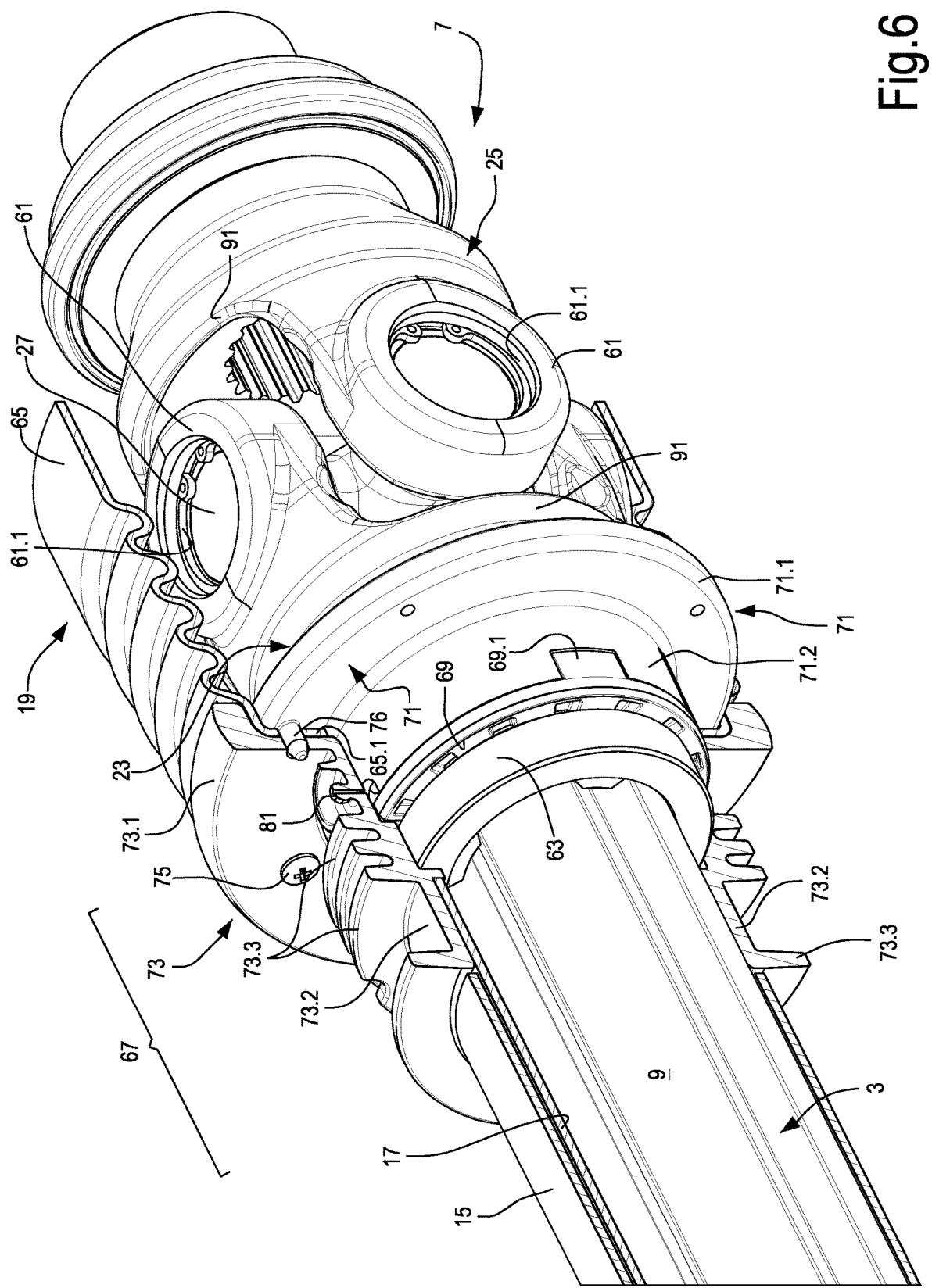
FIG. 6 is an enlarged and partially cut-away isometric view of the end of FIG. 4 of the drive shaft.
Figure 11:
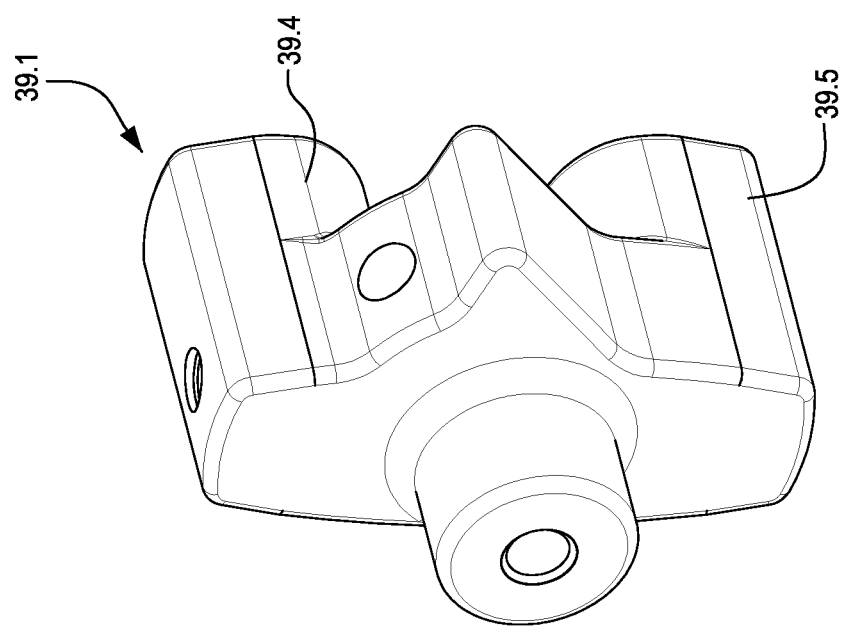
FIGS. 11 and 12 are isometric views, according to two different angles, of the lubricant distribution block of the system of FIG. 9.
Figure 12:
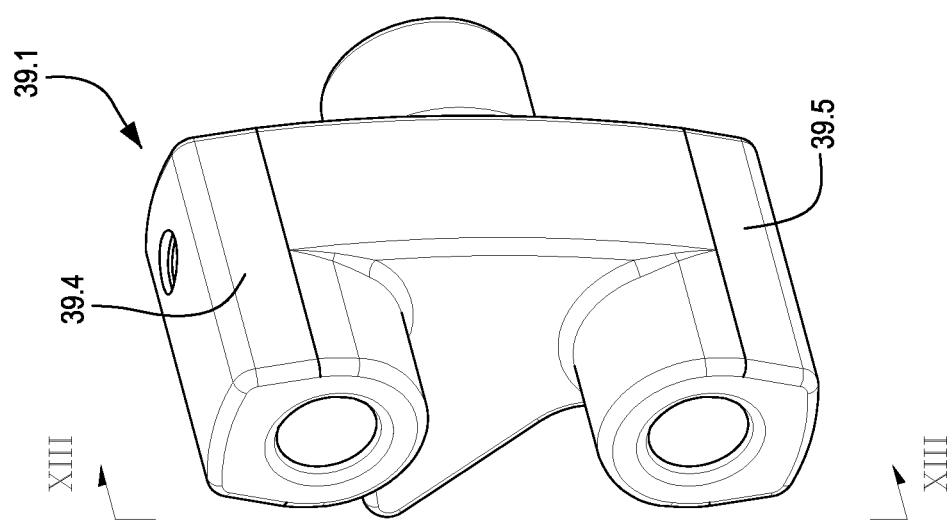
Figure 19:
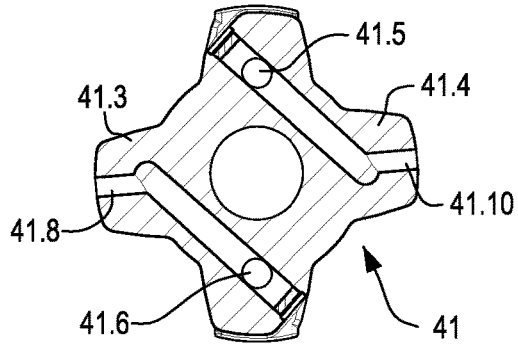
FIG. 19 shows a cross-section according to XIX-XIX of FIG. 18.
Figure 18:
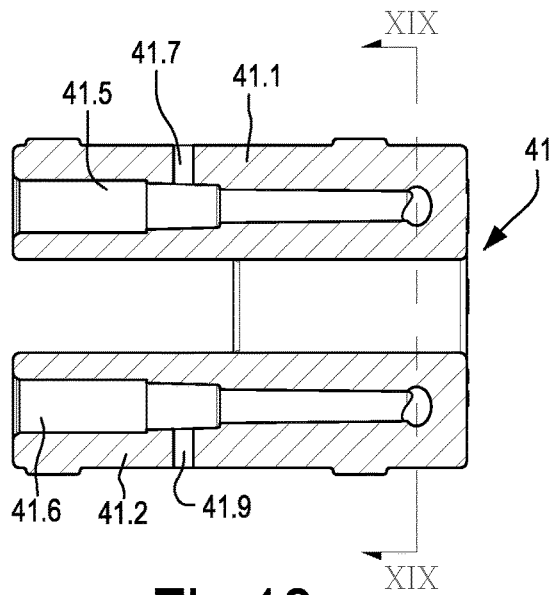
FIG. 18 shows a cross-section according to XVIII-XVIII of FIG. 17.
Figure 17:
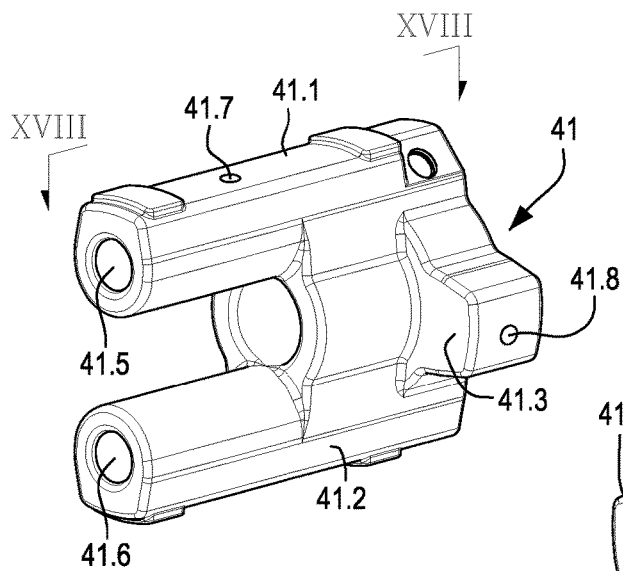
FIGS. 16 and 17 are isometric views, according to two different angles, of the block where the lubricant receiving chamber of the lubrication system of FIG. 9 is realized.
Figure 16:
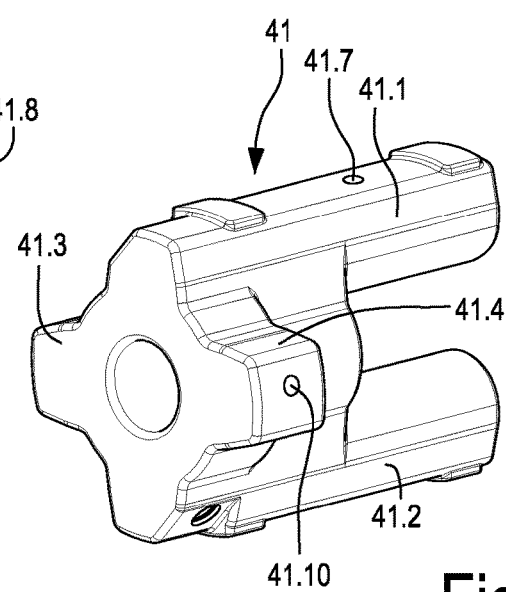

In the following description and the attached claims, the term "approximately" indicates a quantity that is approximate, with an approximation of +/−15%, preferably +/−10% and in some instances preferably +/−5%. In other words, "approximately A" refers to an interval comprised between (A+0.15A) and (A−0.15A), and preferably between (A+0.1A) and (A−0.1A), or between (A+0.05A) and (A−0.05A).

FIG. 1 shows a cross-section, according to a longitudinal plane containing the rotation axis, of a drive shaft 1; FIGS. 2 to 8 show enlargements of the two ends of the drive shaft 1, in some cases with cut-away and/or removed parts.

With reference to FIGS. 1 to 9, the drive shaft 1 generally comprises a power transmitting telescopic shaft 3 with two ends; with these ends, a first universal joint 5 and a second universal joint 7 are associated. As better detailed below, the universal joints 5 and 7 have connection means for connecting to power take-offs of the power source and of the load, i.e. a driven machine for instance.

The telescopic shaft 3 comprises two tubular elements, simply called "telescopic tubes", one of which is inserted inside the other. More in particular, in the embodiment of FIG. 1 the telescopic shaft 3 comprises a first tubular element, here below referred to as outer tubular shaft or simply outer shaft 9, and a second element, that is tubular in the illustrated example, referred to as inner tubular shaft or simply inner shaft 11.

The inner shaft 11 is inserted in the outer shaft 9 in telescopic fashion, and both are so shaped as to slide with respect to each other parallel to the axis A-A of the telescopic shaft; however, the respective cross-sections of the shafts are such that the shafts cannot rotate with respect to each other. This means that the shafts are torsionally coupled together so as to rotate integrally and to transmit power from a power source (not shown) to a user, i.e. a load, constituted for example by a driven machine or an operating machine (not shown).

As shown in particular in the cross-section of FIG. 2, the shafts 9 and 11 have a non-circular tubular wall, so as to torsionally couple together. More in particular, the shape of the cross-section of both the shafts 9 and 11 has four longitudinal projections, through which the two tubular shafts 9 and 11 engage. Specifically, the inner shaft 11 has four longitudinal projections 11.1, engaging inside grooves provided at as many longitudinal projections 9.1 of the outer shaft 9. More details on the configurations of the shafts 9 and 11 will be described below.

The universal joint 5 is connected to an end of the inner shaft 11 and comprises a first fork 23 and a second fork 25, joined together by means of a spider 27. Here below, the fork 23 will be also called inner fork, whilst the fork 25 will be called outer fork. The inner fork 23 is rigidly connected to the first end of the inner shaft 11 of the telescopic shaft 3, whilst the outer fork 25 may be connected to a power take-off or to any other member of a mechanical transmission line, not shown, of which the drive shaft 1 is part.

Analogously to the universal joint 5, also the universal joint 7 comprises a first fork (inner fork), indicated again with reference number 23, and a second fork (outer fork) indicated again with reference number 25, joined together by means of a spider indicated again with reference number 27. The inner fork 23 is rigidly connected to a first end of the outer shaft 9, whilst the outer fork 25 may be connected to a power take-off or to any other member of a mechanical transmission line, not shown.

The drive shaft 1 also comprises an accident-preventing protection 13. The accident-preventing protection 13 comprises a telescopic tubular protection formed by a pair of tubular elements 15, 17, one of which is slidable inserted in the other. The tubular elements 15, 17 (here below referred to simply as "tubes") are preferably so shaped as to be torsionally coupled, i.e. they cannot rotate with respect to each other around the axis A-A of the telescopic shaft 3, but they can axially slide in the direction of the axis A-A. In this way, the accident-preventing protection 13 can follow the lengthening and shortening movements of the drive shaft 1. The shape of the cross-section of the tubes 15, 17 is visible in FIG. 2. The tubes 15, 17 have a non-circular cross-section, for preventing the mutual rotation thereof. More in particular, in the illustrated example the two tubes 15, 17 of the accident-preventing protection 13 comprise projections 15.1 and 17.1, the ones inserted into the others and sliding with respect to one another in the direction of the axis A-A.

In addition to the tubes 15 and 17, the accident-preventing protection 13 further comprises two ends protections 19, one of which is associated with the universal joint 5 and the other with the universal joint 7. More details on the configurations of the end protections 19 will be described below.

In the illustrated embodiment, the telescopic shaft 3 is provided with a lubrication system 37 housed inside the inner tubular shaft 11. FIGS. 9 to 19 show the components of the lubrication system in detail. The lubrication system 37 is adapted to supply lubricant, in particular lubricating grease, in the gap between the inner shaft 11 and the outer shaft 9 forming the telescopic shaft 3.

For the sake of clarity of representation, in FIG. 9 the lubrication system 37 and the inner shaft 11 are shown separately from the other components of the drive shaft 1. The two main components of the lubrication system 37 are shown, in different views and cross-sections, in FIGS. 11 to 15 and 16 to 19 respectively.

In the illustrated embodiment, the lubrication system 37 comprises a lubricant receiving chamber 39, formed in a block 39.1, and a lubricant distribution block 41. The block 39.1 is shown in detail in FIGS. 11 to 15, whilst the lubricant distribution block 41 is shown in FIGS. 16 to 19.

In the illustrated embodiment, the block 39.1 is fastened in the hollow space of the inner shaft 11. For fastening, a nipple 39.3 can be for example used, transversally extending through the wall of the inner shaft 11 and through the wall of the outer shaft 9, so as to be accessible by the operator. The nipple 39.3 can be accessed from the outside of the accident-preventing protection through an opening 40 closed by means of a protective lid 40.1, see FIG. 3.

The lubricant receiving chamber 39 is connected to the lubricant distribution block 41 through a delivery system 43. In the illustrated example, the delivery system 43 comprises two transferring ducts 43.1 and 43.2, for example in the form of two rigid or flexible small tubes extending in axial direction inside the inner shaft 11. Between the lubricant receiving chamber 39 and each of the transferring ducts 43.1, 43.2, a gauged hole 39.2 is provided, i.e. a hole of dimensions significantly lower than the cross-section of the transferring duct 43.1, 43.2. In this way, by injecting pressurized lubricating grease into the lubricant receiving chamber 39, the lubricant is supplied to the two transferring ducts 43.1, 43.2 in balanced way, without following a preferred path, thanks to the fact that most of the pressure drop in the fluid system represented by the lubricating grease is concentrated in correspondence of the necking represented by the gauged holes 39.2.

Each transferring duct 43.1 and 43.2 is fastened to the block 39.1 by inserting a first end of each transferring duct 43.1, 43.2 into a seat provided in a corresponding connection 39.4 and 39.5 of the block 39.1. The opposite end of each transferring duct 43.1, 43.2 is inserted into a seat provided in a corresponding connection 41.1, 41.2 of the lubricant distribution block 41. The two connections 41.1 and 41.2 form two retaining appendices of the lubricant distribution block 41 inside the inner hollow shaft 11. More in particular, the retaining appendices engage inside two opposite grooves of the shaped profile forming the inner shaft 11, these grooves forming, on the outer surface of the inner shaft 11, the longitudinal projections 11.1.

Advantageously, as shown in particular in FIGS. 9 and 16 to 19, the lubricant distribution block 41 comprises two further retaining appendices 41.3 and 41.4, engaging the other two opposite grooves of the shaped profile forming the inner shaft 11.

In the inside thereof, the lubricant distribution block 41 comprises a plurality of lubricating ducts 41.5, 41.6, the number of which is equal to the number of transferring ducts 43.1, 43.2. In the illustrated example, the two shafts 9, 11 have four longitudinal projections and four respective longitudinal grooves for mutual torsional coupling therebetween. In this case, the number of lubricant transferring ducts 43.1, 43.2 and the number of lubricating ducts 41.5, 41.6 is equal to half the number of longitudinal grooves. Using the same ratio, if the inner and outer shafts have six longitudinal projections and six corresponding longitudinal grooves for torsional coupling, three lubricating ducts and three corresponding lubricant transferring ducts may be provided.

Each lubricating duct 41.5, 41.6 is fluidly connected to lubricant supply ports, so arranged as to supply lubricant in the gap between the outer shaft 9 and the inner shaft 11 in correspondence of the longitudinal projections 9.1 and 11.1, i.e. near the mutually touching and mutually sliding surfaces of the shafts 9, 11.

In the illustrated embodiment, each lubricating duct 41.5 and 41.6 is fluidly connected to two respective transverse holes 41.7, 41.8 and 41.9, 41.10 respectively. The transverse holes 41.7 and 41.9 end in correspondence of the appendices where the ends of the transferring ducts engage, whilst the transverse holes 41.8 and 41.10 end on the outer surfaces of the retaining appendices 41.3 and 41.4. The transverse holes 41.7 and 41.8 fluidly connected to the lubricating duct 41.5 and to the lubricant transferring duct 43.1 are therefore offset with respect to each other in a longitudinal direction, i.e. parallel to the axis A-A of the telescopic shaft 3, and are also angularly offset, so as to supply lubricant to two longitudinal projections 11.1, arranged one following the other in two different positions along the axial extension of the telescopic shaft 3. Analogously, the transverse holes 41.9 and 41.10 are offset both in axial direction and angularly, and are so arranged as to supply lubricant to the two remaining longitudinal projections 11.1.

The inner shaft 11 has four radial holes, on the four longitudinal projections 11.1, aligned with the transverse holes 41.7, 41.8, 41.9 and 41.10. More in particular, the four radial holes are provided on the head surfaces of the longitudinal projections 11.1, i.e. on the outermost radial surfaces of the inner shaft 11. For the sake of accuracy, the lubricant distribution block 41 may be manufactured devoid of the holes 41.7, 41.8, 41.9 and 41.10, these latter being machined once the lubricant distribution block 41 has been inserted into the inner shaft 11. Both the radial holes in the head surfaces of the longitudinal projections 11.1 of the shaft 11, and the transverse holes 41.7, 41.8, 41.9, 41.10 in the lubricant distribution block 41 can be machined with a drilling tool.

As the wall of the inner shaft 11 shall have through holes in correspondence of the transverse holes 41.7, 41.8, 41.9, 41.10, the arrangement described above with the holes in axially offset positions prevents excessive weakening of a cross-section of the inner shaft 11.

To connect directly the lubricating ducts 41.5, 41.6 and the gaps between the inner shaft 11 and the outer shaft 9, tubular pins 51 may be provided, extending from the respective lubricating duct 41.5, 41.6 up to the head surface of the respective projections 11.1 of the inner shaft 11 through holes 11.9 of the tubular wall of the inner shaft 11 that define lubricant supply ports. The tubular pins 51 are also used to hold the lubricant distribution block 41 in a correct position inside the inner shaft 11.

With the arrangement described above, the lubricating grease can be supplied in a particularly efficient manner in the gap between the inner shaft 11 and the outer shaft 9 of the telescopic shaft 3. In fact, the lubricant is supplied exactly to the areas where it is required, i.e. between the outer surfaces of the longitudinal projections 11.1 of the inner shaft 11 and the inner surfaces of the corresponding grooves of the outer shaft 9, where the longitudinal projections 11.1 are slidable housed.

Furthermore, at least one lubricant supply port 11.9 is provided for each longitudinal projection 11.1 and the lubricant supply ports are arranged longitudinally offset along the axial extension of the telescopic shaft 3, so that the lubricant is supplied on a greater length of the telescopic shaft.

In order that the drive shaft 1 operates more effectively and for a longer time, in some embodiments an improved support and lubrication system of the accident-preventing protection 13 is provided on the inner components of the drive shaft 1, and more precisely on the inner forks 23 of the end universal joints 5, 7.

Figure 22:
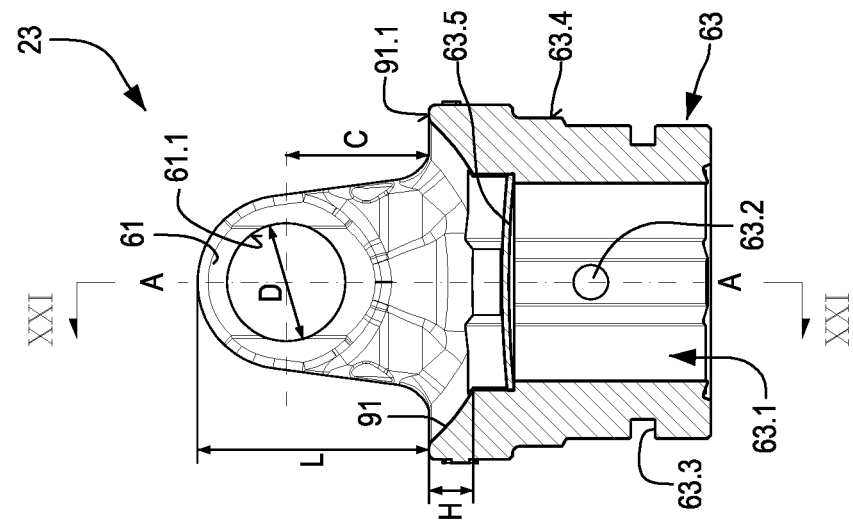
FIG. 22 shows a cross-section according to a plane with trace XXII-XXII of FIGS. 20 and 21.
Figure 21:
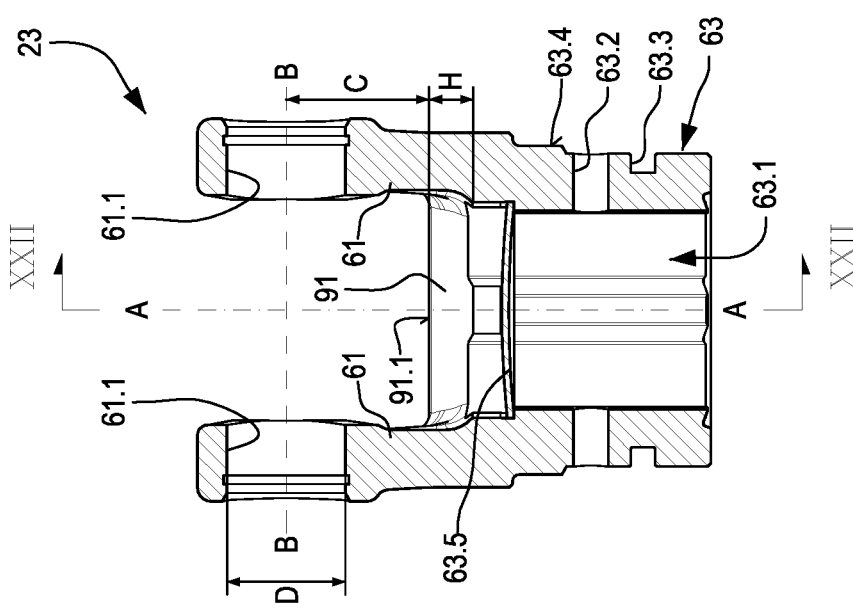
FIG. 21 shows a cross-section according to the plane with trace XXI-XXI of FIG. 22 of the inner fork of FIG. 20.
Figure 20:
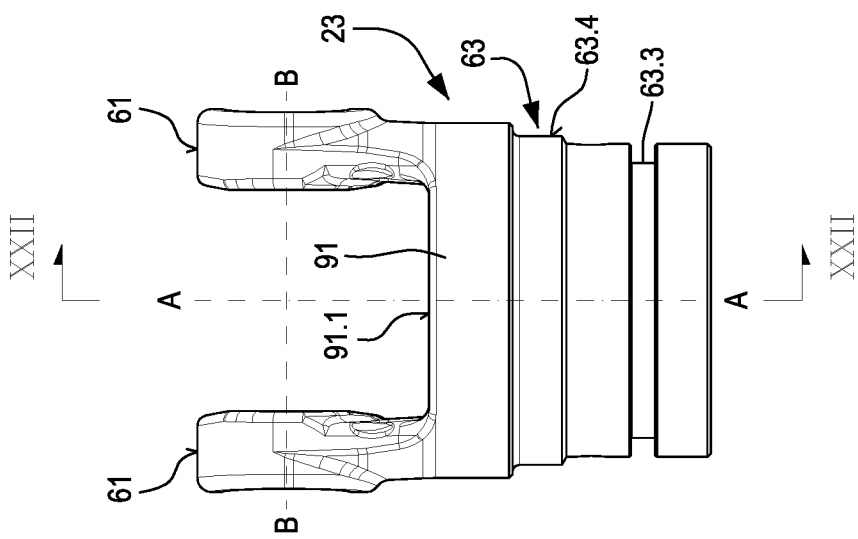
FIG. 20 is a side view of one of the inner forks of the universal joints of the drive shaft of FIG. 1.

One of the two inner forks 23 is individually illustrated in detail in the side view of FIG. 20 and in the two cross-sections of FIGS. 21 and 22. The fork 23 comprises two arms 61, to which the spider 27 connects, and a sleeve 63; in the inner axial cavity 63.1 of the sleeve, an end of the outer shaft 9 or of the inner shaft 11 is inserted. The shaft is fastened to the fork by means of an axial constraint member, constituted, in the illustrated example, by a transverse pin 64 (see FIGS. 1 and 3) extending across the shaft 9 or 11 and the sleeve 63 through radial holes 63.2.

The inner axial cavity 63.1 is advantageously provided with a closing lid preventing solid and liquid debris from entering from the outside during operation of the drive shaft 1. This is particularly useful in the agricultural industry, where the universal joint operates in environments where there is debris that can penetrate the telescopic shaft 3, jeopardizing the operation thereof or, anyway, making the operating conditions of the telescopic shaft 3 worse. The presence of lids 63.5 at both ends of the drive shaft, and thus at both inner forks 23 of the joints 5, 7, reduces the quantity of debris entering the telescopic shaft 3, and protects therefore the surfaces of the tubular shafts 9, 11 in sliding contact with one another, increasing the useful life of the telescopic shaft and reducing the need for adding lubricating grease. In this way, the telescopic shaft 3 can be greased less frequently.

To allow the tubular shafts 9, 11 to slide freely without the formation of over- or de-pressurization therein, notwithstanding the lids 63.5 closing the ends, it is sufficient to provide small air outlets, arranged in the most suitable places, for instance on the sleeve of the fork or on the lid.

The sleeve 63 has, on the outer surface thereof, an annular groove 63.3 and an annular or cylindrical bearing surface 63.4, which forms an annular bearing track for the respective end protection 19, as explained below.

As shown in particular in the enlarged cross-sections of FIGS. 3 and 4 and in the partially cut-away isometric views of FIGS. 5 to 8, each end protection 19 comprises two main parts, and more precisely a flexible hood 65 and a rigid annular structure 67. In this description, the terms "rigid" and "flexible" have a relative meaning, i.e. the hood 65 is more flexible than the annular structure 67. In fact, the hood 65 is able to be deformed to adapt to the mutual inclination of the two forks 23, 25 of the universal joint 5, 7, whilst the annular structure 67 stably connects the end protection 19 and the whole accident-preventing protection 13 to the telescopic shaft 3.

In some embodiments, the flexible hood 65 has corrugated structure and is flared, as shown in the cross-sections of FIGS. 3 and 4. The shape of the hood 65 is given just by way of non-limiting example. Other shapes are also possible, for example with greater or lower axial extension. The hoods 65 can be also realized in more parts combined with one another.

The annular structure 67 comprises an annular sliding block 69 engaging the annular groove 63.3 of the sleeve 63 of the respective inner fork 23. In some embodiments, the annular sliding block 69 is made of a plurality of parts, for example two separate semi-annular parts, for installation easiness. In use, the annular sliding block 69 is stationary, as it is integral with the accident-preventing protection 13, whilst the drive shaft 1 rotates inside the accident-preventing protection 13. The annular sliding block 69 and the annular groove 63.3 form a first coupling between the accident-preventing protection 13 and the drive shaft 1. In addition to act as radial support between the end protection 19 and the inner fork 23, the coupling between the annular groove 63.3 and the annular sliding block 69 also acts as an axial coupling, fastening the end protection 19 to the inner fork 23 of the respective universal joint 5, 7 in the direction of the axis A-A of the telescopic shaft 3. As each end protection 19 is rigidly connected to one of the two tubes 15, 17, this axial coupling constrains the whole accident-preventing protection in axial direction with respect to the telescopic shaft 5 and the universal joints 5, 7.

In the illustrated embodiments, the annular structure 67 comprises a sliding ring 71 and a containment sleeve 73, torsionally and axially coupled together, i.e. so coupled as to be prevented from moving with respect to each other in the direction of the axis A-A of the telescopic shaft 3, and angularly around this axis.

The sliding ring 71 has a flange 71.1 and a tubular portion 71.2 surrounding the sleeve 63 of the respective fork 23 of the universal joint 5 or 7. The containment sleeve 73 has a flange 73.1 and a tubular portion 73.2 externally surrounding the tubular portion 71.2 of the sliding ring 71. The tubular portion 73.2 has a plurality of annular tabs 73.3, for purposes that will be described below. The two flanges 71.1 and 73.1 are joined together by means of joining elements, for example screws 75. The mutual angular position of the flanges 71.1 and 73.1 can be defined through reference pins 76 that are integral with the flange 71.1 and enter in holes of the flange 73.1, or vice versa. Between the two flanges 71.1 and 73.1, an inwards facing annular edge 65.1 of the hood 65 is locked. In this way, the hood 65 of the end protection 19 is fastened to the annular structure 67.

The annular sliding block 69, and more exactly the two or more portions forming it, are kept in a seat formed by the tubular portion 73.2 of the containment sleeve 73 and by the sliding ring 71. Appendices 69.1 of the portions forming the annular sliding block 69 torsionally couple the annular sliding block 69 to the sliding ring 71, so that the annular sliding block 69 does not rotate with respect to the annular structure 67.

The inner surface of the sliding ring 71 forms a rest on the annular track 63.4. As shown in particular in FIGS. 3 and 4, between the annular sliding block 69 and the annular track 63.4 a space is defined, delimited by the annular sliding block 69 and the annular track 63.4, as well as by the outer surface of the sleeve 63 of the inner fork 23, and by the sliding ring 71. This space forms a lubricating grease reservoir, to grease the rest and mutual sliding surfaces between the inner fork 23 and the end protection 19. The rest and sliding surfaces are represented by the annular groove 63.3 and by the respective annular sliding block 69, as well as by the annular track 63.4 and by the inner surface of the sliding ring 71. These two rest surfaces are spaced from each other in axial direction, as therebetween there is interposed the axial constraint member (pin 64) fastening the inner fork 23 to the outer shaft 9 or to the inner shaft 11 of the telescopic shaft 3. This distance allows to optimize support and to form a relatively capacious space for the lubricating grease.

The lubricating grease reservoir defined between the sliding ring 71 and the containment sleeve 73 may be filled with lubricating grease for instance through at least one nipple 81 which may be integral with the containment sleeve 73, or made in a single piece therewith. The annular tabs 73.3 may protect the nipple 81 from impacts against external items, especially when transporting the drive shaft 1.

The arrangement described above allows to have available a significant quantity of lubricating grease inside the accident-preventing protection 13, and especially in the area of sliding contact between the end protections 19 and the inner forks 23 of the universal joints 5, 7. This allows the drive shaft to have a long life without the need for intermediate greasing interventions.

Moreover, the space containing the lubricating grease has an annular extension and forms a barrier efficiently contributing to avoid, or to limit, liquid and solid debris entering towards the inside of the telescopic shaft 3. This increases the useful life of the telescopic shaft 3 and reduces the needs for greasing it.

In order efficiently to couple each end protection 19 to the telescopic tubular protection formed by the tubes 15, 17, nut and bolt coupling systems may be provided. For example, a bolt 83 may be provided, as well as a tubular nut 85 with an internally threaded hole and a hexagonal head, see in particular FIGS. 3 and 4 and the enlarged cross-section of FIG. 4A. Advantageously, the length of the tubular nut 85 may be such as to extend through almost the entire thickness of the respective tube 15 or 17 and of the tubular portion 73.2 of the containment sleeve 73. In this way, the two screw members are coupled together, and the containment sleeve 73 and/or the tube 15 or 17 are pressed in a controlled manner. In this way, the components 15, 17, 73, usually made of plastic, of the accident-preventing protection are not damaged due to compression. An elastic ring 87 prevents the two screw members 83, 85 from unscrewing. The elastic ring 87 also acts as a support for the head of the bolt 83, which therefore does not directly press against, nor rub, the plastic material, of which the accident-preventing protection 73 is made. Even if in the drawing only a single nut and bolt system 83, 85, 87 is shown, in advantageous embodiments these coupling elements may be more, for example two, three or four, uniformly distributed around the axis A-A of the drive shaft.

In order to improve the operating conditions of the universal joints 5, 7 and the overall efficiency of the drive shaft 1, in some embodiments described herein a particular shape for the inner forks 23 and the outer forks 25 of the universal joints 5, 7 is provided. One of the inner forks 23 is shown in detail in FIGS. 20, 21, 22, and one of the outer forks 25 is shown in detail in FIGS. 23, 24 and 25.

As mentioned above, the inner forks 23 comprise a sleeve 63, internally perforated and grooved for being inserted into, and torsionally coupled to, the end of the outer shaft 9 or of the inner shaft 11, the end being fastened to the inner fork 23 through an axial constraint member, in the illustrated example constituted by the pin 64 (FIG. 3). From the sleeve 63 a collar 91 extends, ending with an end edge 91.1, in particular and advantageously of circular shape, opposite the sleeve 63. The arms 61 of the inner fork 23 extend from the end edge 91.1. In the illustrated embodiment, the sleeve 63, the collar 91 and the arms 61 are made in a single piece, for example by casting and subsequent chip removal machining.

In the illustrated embodiment, the collar 91 has a toroidal hollow shape, essentially a cup-shape, surrounding a concave inner space. The concave inner space is delimited by a surface, shaped approximately as a spherical zone, defined between a plane tangent to the edge 91.1 and by a plane orthogonal to the axis A-A of the fork 23 (coinciding with the axis A-A of the telescopic shaft 3) and passing through the end of the axial cavity 63.1 of the sleeve 63.

The concave inner space delimited by the collar 91 has a height H in the direction of the axis A-A of the fork. The height H is essentially the height of the spherical segment delimited by the plane tangent to the edge 91.1 and by the plane passing through the end of the inner axial cavity 63.1.

The letter L indicates the length of the arms 61 of the fork 23. The collar 91 allows reducing the length of the arms 61 and increases the bending stiffness of the arms 61.

Advantageously, the height H of the concave space inside the collar 91 is at least approximately 10% of the length L of the arms 61. The height H is preferably equal to, or greater than, approximately 15%, more preferably equal to, or greater than, approximately 20% of the length L, and not greater than approximately 50%, preferably not greater than approximately 40% and more preferably not greater than approximately 30% of the length L of the arms 61.

Each arm 61 comprises a seat 61.1 with circular cross-section, where one of the four trunnions 27.1 that extend from a central body 27.4 of the spider 27 (FIGS. 26, 27) are housed. Between each trunnion 27.1 and the respective seat 61.1, a radial needle bearing 95 is positioned, described below in greater detail (see FIGS. 26, 27, and 28). Practically, each needle bearing 95 is mounted stably on the respective trunnion 27.1 of the spider 27.

Each seat 61.1 has a diameter D. For a more advantageous operation, as will be better explained below, the ratio between the diameter D and the distance C of the center of the seat 61.1 from the edge 91.1 of the collar 91 is comprised between approximately 0.7 and approximately 1.1, and preferably comprised between approximately 0.7 and approximately 0.95. Due to the fact that, for the reasons explained below, it is preferable that the diameter of the trunnions 27.1 of the spider 27 be greater than that of the trunnions of the prior art joints, in preferred embodiment the ratio mentioned above is equal to, or greater than, approximately 0.75, and equal to, or lower than, approximately 1.1, preferably not greater than approximately 1.

In some embodiments, the center of curvature of the spherical inner concave surface of the collar 91 is located on the axis (B-B) of the respective aligned pair of seats 61.1 of the respective pair of arms 61. In some embodiments, the ratio between the diameter D of each seat 61.1) and the radius of the inner concave surface of the collar is comprised between about 0.48 and about 0.65, preferably between about 0.49 and about 0.64.

The structure and ratios indicated above are characteristic of the fork for a reduced length of the arms 61. However, the seats 61.1 provided in said arms 61 are adequately spaced from the sleeve 63 thanks to the presence of the collar 91. The flared or cup-like shape of the collar 91 allows an appropriate maximum mutual inclination of the axes of the inner and outer forks 23, 25 of the joints 5, 7. Practically, the dimensions are such that the axes of the two forks 23, 25 of the same universal joint 5, 7 can take any mutual angular position, from the coaxial position (angle between the axes equal to 0°) up to a position of maximum inclination (angle between the axes equal to approximately 75°, for instance).

Figure 27:
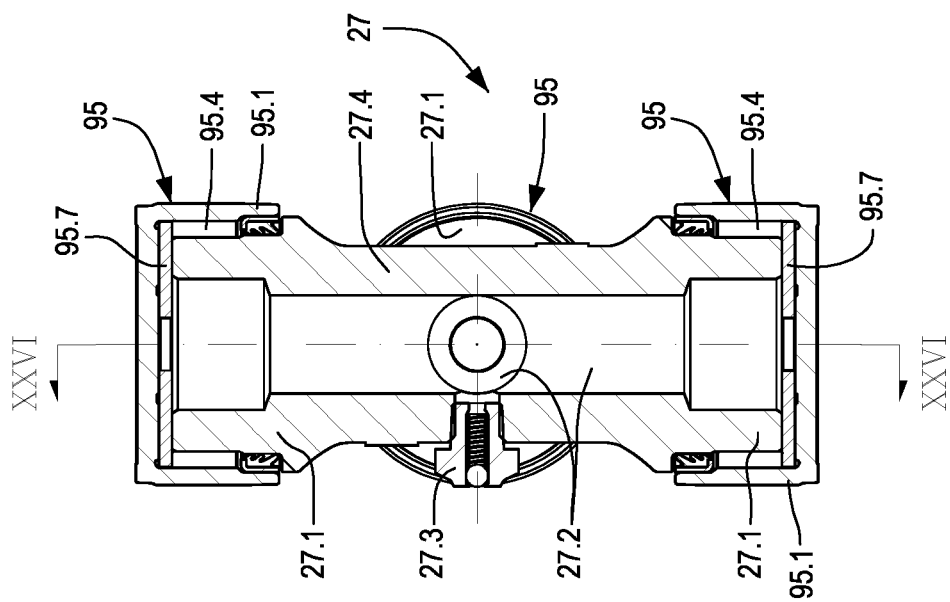
FIG. 27 shows a cross-section according to a plane with trace XXVII-XXVII of FIG. 26.
Figure 26:
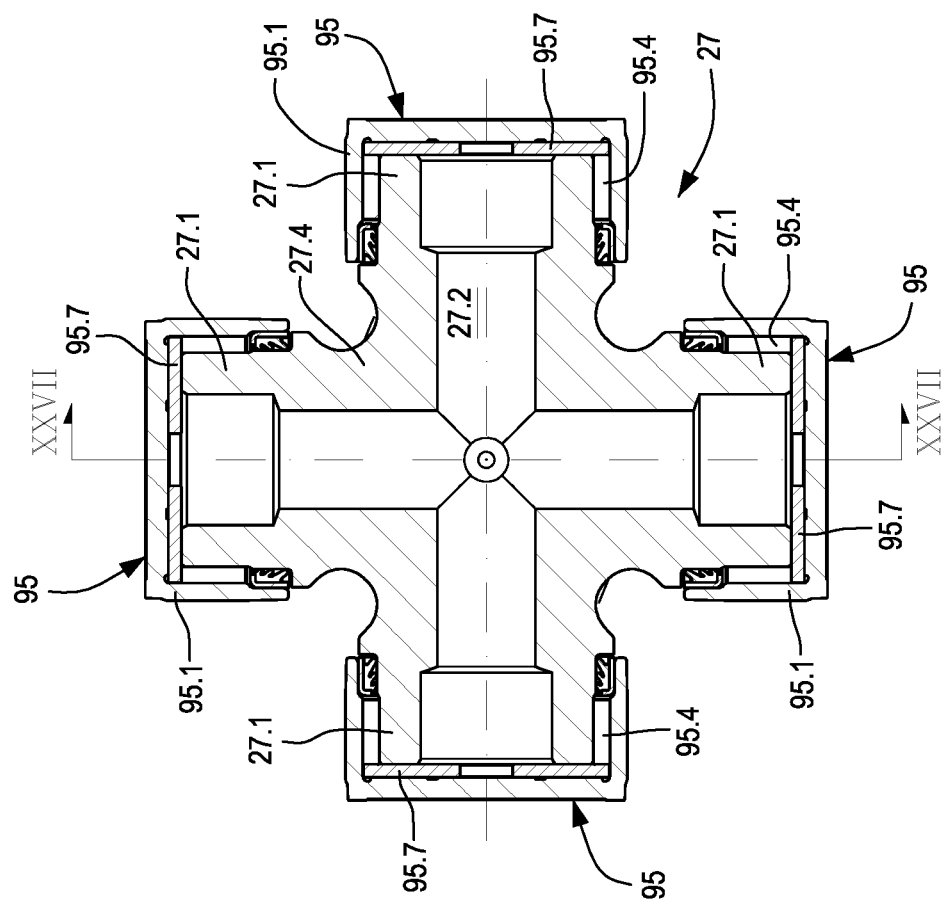
FIG. 26 shows a cross-section of one of the spiders of the universal joints of the shaft of FIG. 1 according to a plain containing the axes of the four trunnions of the spider, according to t plane with trace XXVI-XXVI of FIG. 27.
Figure 28:
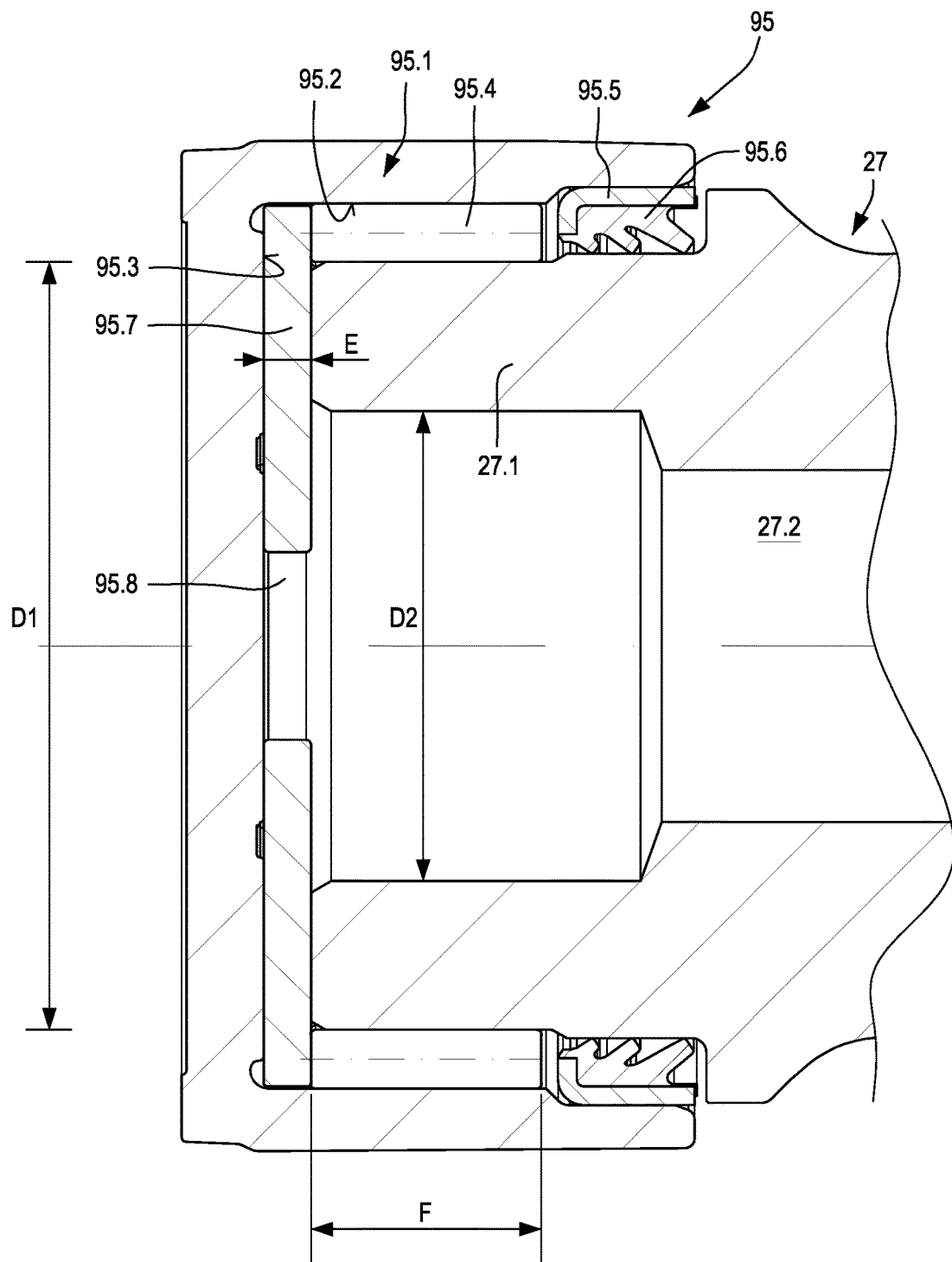
FIG. 28 shows an enlargement of a bearing of the spider of FIGS. 26 and 27.

As shown in FIGS. 26, 27, and in particular in the enlargement of FIG. 28, each needle bearing 95 comprises a cylindrical cup-shaped housing 95.1. The cylindrical housing 95.1 comprises a cylindrical wall with an inner cylindrical surface 95.2, and a substantially flat bottom surface 95.3 orthogonal to the axis of the needle bearing 95. Each needle bearing 95 comprises a plurality of needles 95.4 provided between the cylindrical surface of the respective trunnion 27.1 and the inner cylindrical surface 95.2 coaxial to the trunnion 27.1. Thanks to the increased diameter of the seats 61.1 and, therefore, of the needle bearings 95, it is possible to house, in each needle bearing 95, a relatively high number of needles 95.4, greater than that provided for in the prior art universal joints.

On the side opposite the bottom surface 95.3, the housing 95.1 is closed by means of a lip seal 95.6 housed in a containment ring 95.5, to avoid, or to reduce, the leakage of lubricating grease contained in the needle bearing 95.

Advantageously, the bottom surface 95.3 of the cylindrical housing 95.1 is spaced from the end surface of the respective trunnion 27.1. To this end, an annular spacer 95.7 may be provided, for instance. The distance E between the end surface of the trunnion 27.1 and the bottom surface 95.3 of the cylindrical housing 95.1, i.e. the thickness of the annular spacer 95.7, is at least equal to the radius of the needles 95.4 and equal to, or lower than, three times the radius. The annular spacer 95.7 may be made of a material different from that of the spider 27 and the housing 95.1. For example, these latter may be made of metal, and the annular spacer 95.7 may be made of a polymeric material. The annular spacer 95.7 reduces, or eliminates, the axial clearance between each housing 95.1 and the respective trunnion 27.1 of the spider 27.

In advantageous embodiments, the spider 27 have an inner channel extending along the spider arms, on which the trunnions 27.1 are provided. The inner channel may be constituted by two orthogonal holes 27.2 coaxial with the axes of the trunnions 27.1 of the spider 27. The through holes end on the end surfaces of the four trunnions 27.1 of the spider 27.

As mentioned above, given the same torque that can be transmitted by the universal joint, of which the spider 27 is part, the trunnions 27.1 of the spider 27 have larger diameter than the trunnions of the prior art spiders. This allows providing holes 27.2 of relatively large diameter, thanks both to the greater space available inside the trunnions, and to the fact that the trunnions 27.1, having larger diameter than that in the prior art spiders, can be made hollow, while keeping a sufficient mechanical strength for transmitting forces.

In advantageous embodiments, the ratio between the maximal inner diameter (indicated with D2 in FIG. 28) of the hole 27.2 along the respective trunnion 27.1 and the outer diameter (indicated with D1 in FIG. 28) of the trunnion 27.1 is equal to, or greater than, approximately 0.3, preferably equal to, or greater than, approximately 0.4, more preferably equal to, or greater than, approximately 0.6. In preferred embodiments disclosed herein, the ratio is not greater than approximately 0.8, preferably not greater than approximately 0.75. In advantageous embodiments, the ratio D2/D1 is comprised between approximately 0.4 and approximately 0.7.

The set of holes 27.2 forms a lubricating grease reservoir, fluidly connected to the needle bearings 95 through the space between the head of the trunnions 27.1 and the bottom surface 95.3 of the housings 95.1, where the annular spacer 95.7 is provided. In this way, when filling the space of the holes 27.2 with lubricating grease, a stock of lubricating grease is formed, that can be enough to ensure lubrication for the whole useful life of the universal joint 5, 7, of which the spider 27 is part. This is obtained thanks to the large diameter of the holes 27.2 and therefore thanks to the large space available for storing lubricating grease.

In use, the rotation of the universal joint 23, 25, of which the spider 27 is part, generates, due to the centrifugal force, a thrust on the lubricating grease that is pushed towards the ends of the trunnions 27.1, and therefore towards the needle bearings 95.

The channel system formed by the holes 27.2 may be fluidly coupled to the environment through a valve 27.3 that can be arranged, for example and preferably, in the center of the spider (see FIG. 27). The valve 27.3 is a check valve, so mounted as to allow air to enter in the channel system formed by the holes 27.2 and to prevent lubricating grease from leaking from the inside of the spider 27. Through the valve 27.3, air can gradually enter the space formed by the holes 27.2, so as to fill the space left free by the lubricating grease that inevitably leaks through the seals 95.6. Therefore, the valve 27.3 avoids depressurization inside the spider 27; the depressurization would otherwise prevent or hinder the flow of the lubricating grease from the holes 27.2 towards the needle bearings 95.

The axial length of the needles 95.4 of the needle bearings 95 is indicated with F in FIG. 28. Advantageously, having a number of needles 95.4 greater than in the prior art universal joints, thanks to the larger diameter of the trunnions 27.1 of the spiders 27, it is possible to reduce the axial length F of the needles without reducing the overall surface of contact between needles 95.4 and trunnion 27.1, i.e. the sum of the surfaces of contact between each needle 95.4 a the trunnion 27.1 of a single needle bearing 95.

In advantageous embodiments, the ratio between the length F (expressed in millimeters) of each needle 95.4 and the number of needles 95.4 in a needle bearing 95 is equal to, or lower than, approximately 0.39, preferably equal to, or lower than, approximately 0.36, in some embodiments equal to or lower than approximately 0.32. Preferably, this ratio is equal to, or greater than, approximately 0.18, in particular and preferably equal to, or greater than, approximately 0.21. These values are essentially lower than those provided for in the prior art universal joints, and are indicative of a different mode of distributing the load between trunnion 27.1 of the spider 27 and needles 95.4 of the needle bearing 95. Practically, reversely to what it is usually provided for, the axial length of the needles 95.4 decreases and the overall surface of contact between needles 95.4 and trunnion 27.1 of the spider 27 increases by increasing the number of needles 95.4 of the single needle bearing 95, thanks to an increase in the diameter of the trunnions 27.1 of the spider 27.

A larger number of needles 95.4 arranged in each needle bearing 95 implies a larger diameter of the respective trunnion and/or a reduction of the diameter of the needles. Increasing the diameter of the trunnion 27.1 of the spider 27 is beneficial not only because it allows a larger number of needles to be arranged in each needle bearing, but also because it allows a larger grease reservoir to be provided inside the spider 27. In implementations, the dimensions of the needles and of the trunnion are selected such that the ratio between the length of the needles 95.4 of each needle bearing 95 and the diameter of the respective trunnion 27.1 is lower than approximately 0.56, preferably lower than approximately 0.5, preferably lower than approximately 0.45, more preferably equal to, or lower than, approximately 0.42. In some embodiments, the needles 95.4 have a diameter comprised between approximately 2.2 and approximately 3.2 mm, preferably between approximately 2.5 and approximately 3 mm.

It has been surprisingly found that this different approach in dimensioning the needles 95.4 have great advantages in terms of operation and useful life of the universal joint 5, 7. In fact, it has been experimentally found that the shorter needles 95.4 tend better to keep the parallelism between axis of the needles 95.4 and axis of the respective trunnion 27.1. In this way, even when the universal joint 5, 7 is strongly loaded and operates with misaligned forks 23, 25, the needles 95.4 tend less to be arranged with the axis inclined with respect to the trunnion axis. This ensures that, under any operating conditions, the needles 95.4 are correctly in contact, for the whole axial length thereof, both with the outer cylindrical surface of the respective trunnion 27.1, and with the inner cylindrical surface 95.2 of the housing 95.1. This optimizes the exploitation of the length of the single needles and avoids anomalous wear concentration in the needle sliding tracks formed by the housing 95.1 and by the trunnion 27.1 of the spider 27.

The different dimensioning of the components of the needle bearings 95 described above may have a synergistic effect with the increased bending stiffness of the arms 61 of the fork 23 achieved through the collar 91 described above. This allows the universal joint 5, 7 to better operate under any load conditions and with any angles between the axes of the forks 23, 25 thanks to the combination of two effects: reduction in the bending deformation of the arms 61 of the forks 23, 25, and better kinematic behavior of the needle bearings 95.

The lubricating grease reservoir formed in each spider and behind each needle bearing 95, between the head surface of the trunnion 27.1 and the bottom surface 95.3 of the housing 95.1, ensures better and more durable greasing.

As a result of the solutions described herein, the universal joint 5, 7 is more durable and requires less, or even no, greasing interventions, as the duration of the lubricant is equal to the useful life of the mechanical components, thanks to the stock of lubricating grease and the better dynamic and kinematic behavior of the joint components.

Figure 25:
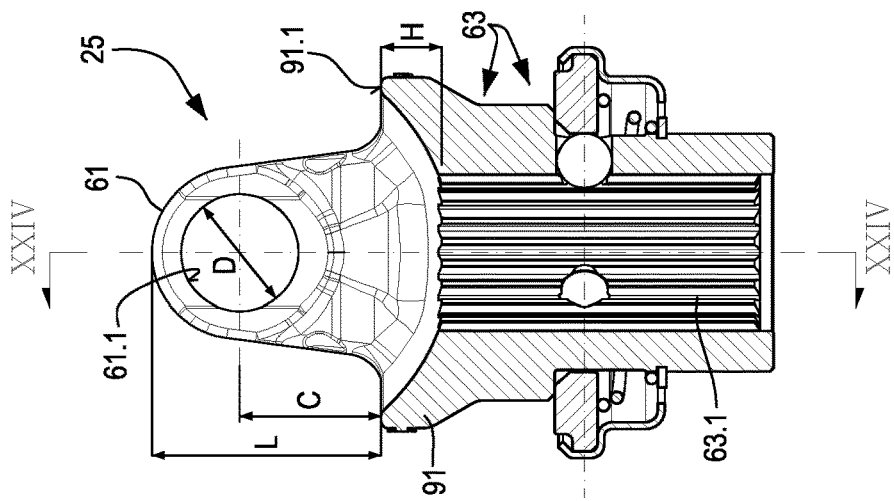
FIG. 25 shows a cross-section according to the plane with trace XXV-XXV of FIGS. 23 and 24.
Figure 24:
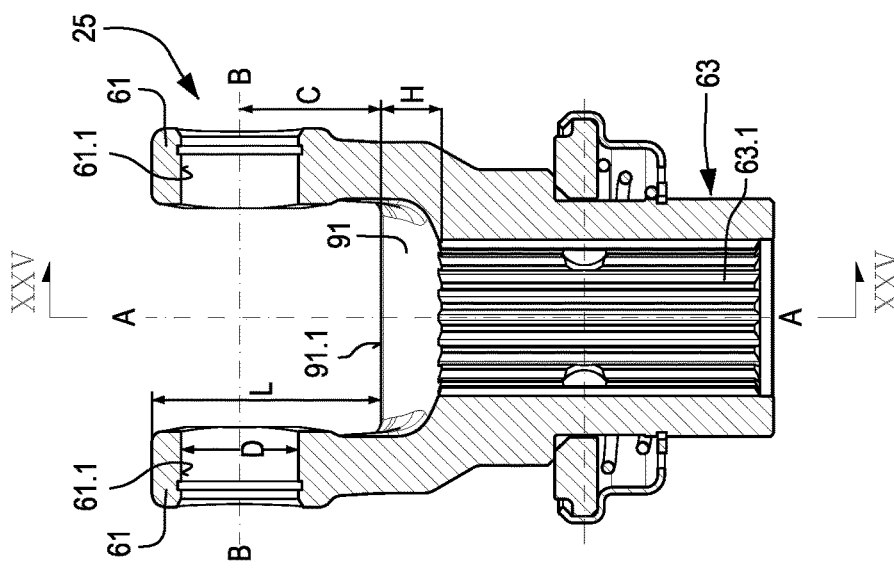
FIG. 24 shows a cross-section according to a plane with trace XXIV-XXIV of FIG. 25.
Figure 23:
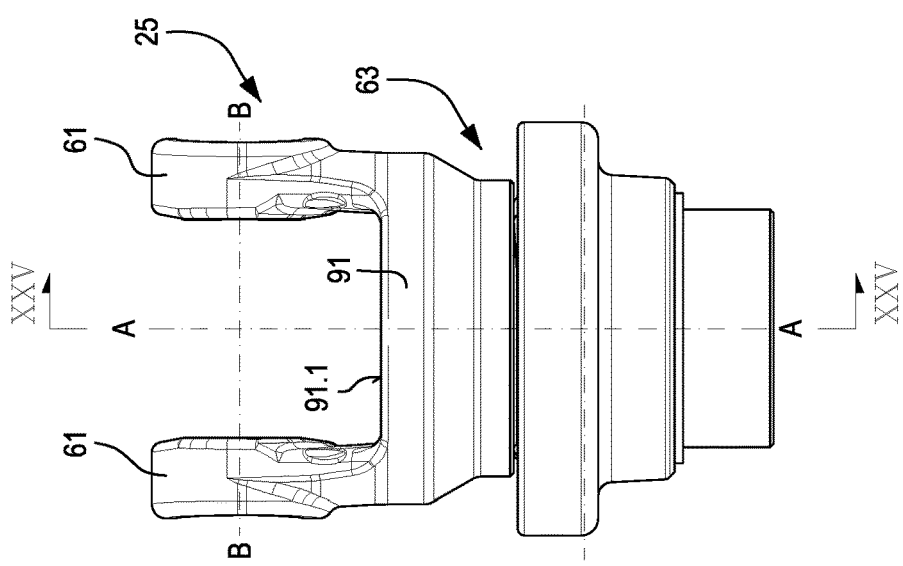
FIG. 23 is a side view, analogous to that of FIG. 20, of one of the outer forks of the universal joints of the drive shaft of FIG. 1.

The features described above with reference to FIGS. 20, 21 and 22 for the inner fork 23 are advantageously provided also for the outer fork 25 of each universal joint 5, 7. FIGS. 23, 24, and 25 show the same views and cross-sections of FIGS. 20, 21, and 22, for an outer fork 25. The same reference numbers indicate the same or equivalent parts in the two forks. The torsional coupling profile between the fork 23, 25 and the shaft, with which it is integral, is different for the outer fork 25 and for the inner fork 23, as the outer fork 25 is so shaped as to couple to a standard grooved profile, whilst the inner fork 23 is so shaped as to couple to the inner tubular shaft 11 or to the outer tubular shaft 9 of the telescopic shaft 3. The remaining structural features of the outer fork 25 are substantially equal to those of the inner fork 23. Therefore, the outer fork 25 will be not described.

Further improvements to a telescopic shaft 3 and to the drive shaft 1 comprising it may be achieved by using a novel profile for the two inner and outer shafts 11, 9 forming the telescopic shaft 3. Novel features of this component of the drive shaft 1 will be disclosed below with specific reference to FIGS. 1, 29, and 30.

Figure 29:
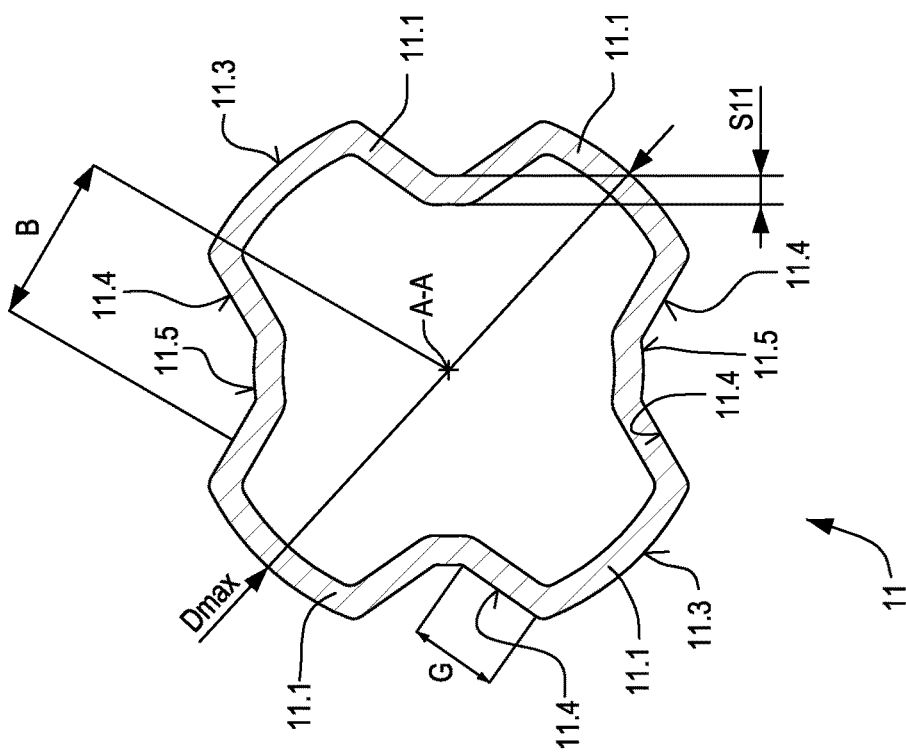
FIGS. 29 and 30 show cross-sections of the inner shaft and the outer shaft, respectively, of the drive shaft of FIG. 1.
Figure 30:
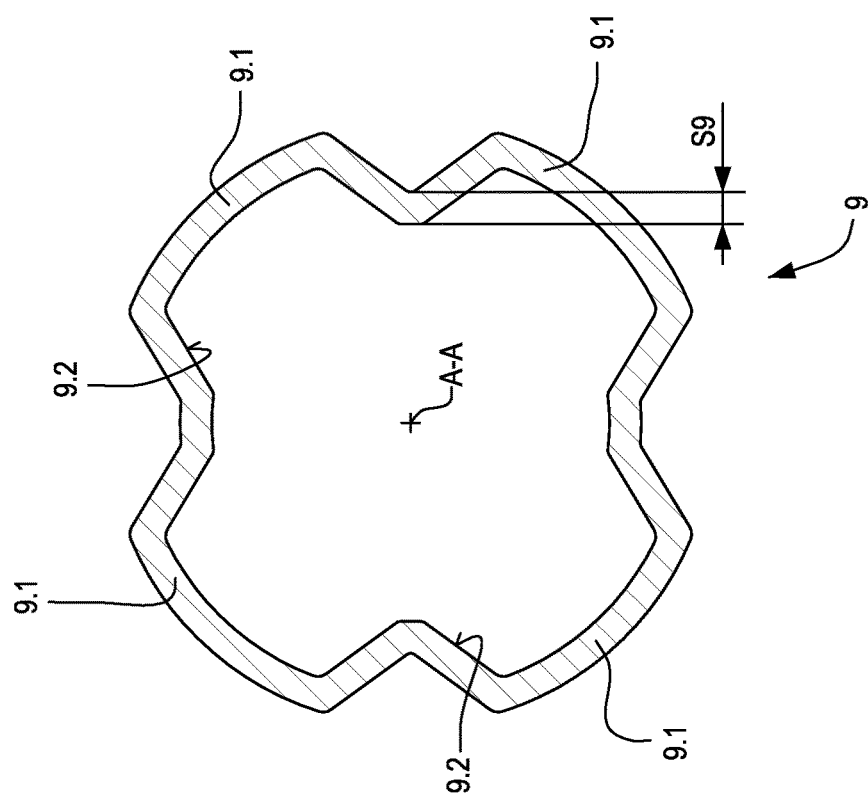

With specific reference to FIG. 29, the inner shaft 11 has a tubular structure of non-circular cross-section, so as to couple torsionally to the outer shaft 9, this latter also having a tubular structure and a transverse cross-section complementary to that of the inner shaft 11. As indicated above, the inner shaft 11 has a tubular wall of thickness S11, defining four longitudinal projections 11.1. The four longitudinal projections 11.1 may be at the same distance from one another or not, as in the illustrated example, so as to define a mutual coupling angle between the two shafts 9 and 11. Each longitudinal projection 11.1 comprises a head surface 11.3 and two side flanks 11.4 joining the respective head surface 11.3 and the bottom of longitudinal grooves 11.5, interposed between pairs of adjacent longitudinal projections 11.1. The letter G indicates the dimension, in cross-section, of each flank 11.4, i.e. the width of each flank 11.4.

In use, the inner shaft 11 and the outer shaft 9 transmit torque from one to the other. The torque is transmitted thanks to the contact between the outer surfaces of the flanks 11.4 of the inner shaft or tube 11 and the inner surfaces of flanks 9.2 of the longitudinal projections 9.1 of the outer shaft or tube 9, i.e. the inner surfaces of longitudinal grooves of the outer shaft 9 corresponding to the longitudinal projections 9.1.

Given the same torque transmitted and the same penetration degree between the inner shaft 11 and the outer shaft 9, a pressure is generated between the surfaces of mutual contact, which the lower is, the greater the width G of each flank 11.4 and the corresponding flank 9.2 is. Moreover, the more distant the contact surface is with respect to the axis of the telescopic shaft 3, the lower the pressure is. In FIG. 29 letter B indicates the distance of the median point of the flank 11.4 from the axis A-A of the telescopic shaft 3.

In order to reduce the pressure between the mutual contact surfaces of the shafts or tubes 9 and 11, it is advantageous to make the profiles of the inner shaft 11 and of the outer shaft 9 so that the ratio between the flank width G and the distance B of the flank median point from the axis of the telescopic shaft 3 is at least equal to, or greater than, approximately 0.35, preferably equal to, or greater than, approximately 0.45, preferably equal to, or greater than, approximately 0.5, and preferably equal to, or lower than, approximately 0.8, preferably equal to, or lower than, approximately 0.6.

According to some embodiments, the product of the flank width G and the distance B of the flank median point from the axis of the telescopic shaft 3, divided by the maximal diameter Dmax of the inner shaft 11, is equal to, or greater than, approximately 2. The maximal diameter Dmax of the inner shaft 11 is the diameter measured at the head surfaces 11.3 of the longitudinal projections 11.1.

In other words, it has been found that particularly advantageous operating conditions, in terms of mechanical stress reduction, together with an adequate compromise in terms of dimensions and weight of the components 9 and 11 of the telescopic shaft occur if $$\frac{B*G}{Dmax} \geq 2$$

The value of this ratio is preferably comprised between approximately 2 and approximately 5, and more preferably between approximately 2.1 and approximately 4.5 mm. These values are obviously calculated by using the same unit of measurement for B, G and Dmax. The ratio is not dimensionless; it is expressed in the unit of measurement of the length used for the three measurements involved. If the measures are expressed in millimeters, the value of the ratio indicated above is also expressed in millimeter. The above relationship is valid for lengths measured in millimeters.

The thickness S11 of the wall of the inner shaft 11 is advantageously comprised between approximately 2 mm and approximately 8 mm, and preferably between approximately 3 mm and approximately 6 mm. In the intervals above, the actual values are set during designing, based on the maximal torque to be transmitted.

The shape of the cross-section of the outer shaft 9 is complementary to that of the inner shaft 11, and it is therefore defined by the above ratio. The thickness S9 of the wall of the outer shaft 9 may be of the same order of magnitude of the thickness S11.

The invention claimed is:

1. A drive shaft comprising:
    an outer hollow shaft, comprising a first end and a second end;
    an inner shaft inserted slidable into the outer shaft and comprising a first end and a second end; wherein the outer shaft and the inner shaft are torsionally coupled and form a telescopic shaft;
    a first universal joint with a first inner fork connected, by means of a respective sleeve, to the first end of the inner shaft;
    a second universal joint with a second inner fork connected, by means of a respective sleeve, to the first end of the outer tubular shaft;
    an accident-preventing protection comprising: a telescopic tubular protection surrounding the outer shaft and the inner shaft and comprising a first protection tube and a second protection tube, one of which is inserted slidable into the other, and sliding with respect to each other; and an end protection for each of said first universal joint and second universal joint; wherein each end protection is constrained to the telescopic tubular protection; wherein each end protection comprises a rigid annular structure, through which the end protection is constrained to the inner fork of the respective universal joint; wherein the rigid annular structure comprises an annular sliding block slidably engaged in an annular groove of the sleeve of the inner fork of the respective universal joint;
    wherein the sleeve of the inner fork comprises an annular bearing track for the end protection, the end protection slidingly resting on the annular bearing track and on the annular groove, the annular bearing track and the annular groove being offset with respect to each other in the direction of the axis of the drive shaft.

2. The drive shaft of claim 1, wherein each end protection comprises a flexible hood fastened to the rigid annular structure.

3. The drive shaft of claim 1, wherein between the annular bearing track and the annular groove a lubricant reservoir is provided, delimited radially inwardly by the sleeve of the inner fork of the respective universal joint and radially outwardly by the rigid annular structure of the end protection.

4. The drive shaft of claim 1, wherein the annular bearing track is arranged between a pair of arms of the inner fork and the annular groove.

5. The drive shaft of claim 1, wherein between the annular bearing track and the annular groove an axial constraint member is arranged, for constraining the inner fork to the outer shaft or to the inner shaft, to which the respective universal joint is constrained.

6. The drive shaft of claim 1, wherein the annular structure of the end protection comprises at least one greasing nipple.

7. The drive shaft of claim 1, wherein the annular bearing track has a cylindrical shape.

8. The drive shaft of claim 1, wherein the annular sliding block is made of at least two pieces.

9. The drive shaft of claim 1, wherein the annular structure comprises a sliding ring having an inner surface slidingly engaging the annular bearing track of the sleeve of the inner fork and resting thereon.

10. The drive shaft of claim 1, wherein each rigid annular structure is fastened to the respective protection tube of the telescopic tubular protection through a nut and bolt system comprising a bolt and a tubular nut having an internally threaded hole and a head; wherein the length of the nut is such as to extend through the thickness of the respective protective tube and the respective rigid annular structure.

11. A drive shaft comprising:
    an outer hollow shaft comprising a first end and a second end;
    an inner shaft inserted slidable into the outer shaft and comprising a first end and a second end, wherein the outer shaft and the inner shaft are torsionally coupled and form a telescopic shaft;
    a first universal joint with a first inner fork connected, by means of a respective sleeve, to the first end of the inner shaft;
    a second universal joint with a second inner fork connected, by means of a respective sleeve, to the first end of the outer tubular shaft;
    an accident-preventing protection comprising: a telescopic tubular protection surrounding the outer shaft and the inner shaft and comprising a first protection tube and a second protection tube, one of which is inserted slidable into the other, and sliding with respect to each other; and an end protection for each of said first universal joint and second universal joint, each end protection being constrained to the telescopic tubular protection, each end protection comprising a rigid annular structure, through which the end protection is constrained to the inner fork of the respective universal joint, the rigid annular structure comprising an annular sliding block slidably engaged in an annular groove of the sleeve of the inner fork of the respective universal joint, the sleeve of the inner fork comprising an annular bearing track for the end protection, the annular bearing track and the annular groove being offset with respect to each other in the direction of the axis of the drive shaft, wherein the annular structure of the end protection comprises: a sliding ring forming a sliding surface into sliding contact with the annular bearing track; and a containment sleeve for containing the sliding ring and the annular sliding block, wherein the containment sleeve is torsionally and axially constrained to the sliding ring.

12. The drive shaft of claim 11, wherein the containment sleeve is adapted to constrain the annular sliding block and the sliding ring to each other in axial direction.

13. The drive shaft of claim 11, wherein the annular sliding block comprises a member for torsionally coupling to the sliding ring.

14. The drive shaft of claim 11, wherein: the sliding ring comprises a first flange; the containment sleeve comprises a second flange; and the hood comprises an annular edge locked between the first flange and the second flange.

15. The drive shaft of claim 11, wherein the containment sleeve comprises a tubular portion externally surrounding a cylindrical portion of the sliding ring.

16. The drive shaft of claim 15, wherein the tubular portion surrounds the annular sliding block.

17. The drive shaft of claim 11, wherein the greasing nipple is provided in the containment sleeve.

18. The drive shaft of claim 11, wherein the containment sleeve comprises a plurality of annular tabs projecting radially outwardly.

19. The drive shaft of claim 11, wherein the containment sleeve surrounds an end portion of the telescopic tubular protection and is fastened to the telescopic tubular protection preferably through at least a pair of screw-like members engaging with each other, and wherein both the screw-like members extend through the thickness of the containment sleeve and of the respective protection tube of the telescopic tubular protection.

20. The drive shaft of claim 11, wherein the containment sleeve has an opening for accessing a greasing nipple of the hollow outer shaft and of the inner shaft, said opening being preferably provided with a closing member.

* * * * *